(12) United States Patent
Saito

(10) Patent No.: US 7,636,206 B2
(45) Date of Patent: Dec. 22, 2009

(54) IMAGING LENS

(75) Inventor: Tomohiro Saito, Kawaguchi (JP)

(73) Assignee: ENPLAS Corporation, Saitama (JP)

( * ) Notice: Subject to any disclaimer, the term of this patent is extended or adjusted under 35 U.S.C. 154(b) by 0 days.

(21) Appl. No.: 11/904,916

(22) Filed: Sep. 28, 2007

(65) Prior Publication Data

US 2008/0094733 A1 Apr. 24, 2008

(30) Foreign Application Priority Data

Oct. 18, 2006 (JP) ............................. 2006-283433
Mar. 28, 2007 (JP) ............................. 2007-083883

(51) Int. Cl.
*G02B 9/12* (2006.01)
(52) U.S. Cl. .................................... 359/791
(58) Field of Classification Search ................ 359/791, 359/784, 740, 716, 689
See application file for complete search history.

(56) References Cited

U.S. PATENT DOCUMENTS 7,006,305 B2 * 2/2006 Amanai ...................... 359/791

2005/0030645 A1 * 2/2005 Do ............................. 359/791
2007/0109668 A1 * 5/2007 Isono .......................... 359/791

FOREIGN PATENT DOCUMENTS

| JP | 2003-322792 | 11/2003 |
|----|-------------|---------|
| JP | 2004-163786 | 6/2004 |
| JP | 2005-091513 | 4/2005 |
| JP | 2005-173298 | 6/2005 |

* cited by examiner

*Primary Examiner*—Alicia M Harrington
(74) *Attorney, Agent, or Firm*—William L. Androlia; H. Henry Koda

(57) ABSTRACT

An imaging lens including, in order from an object side to an image surface side on an optical axis, a first lens that is a meniscus lens having a positive power whose convex surface faces the object side, a diaphragm, a second lens that is a meniscus lens having a positive power whose convex surface faces the image surface side, and a third lens that is a biconcave lens having a negative power, wherein conditions expressed by $0.023 \leq d_4/f1 \leq 0.11$ and $0.068 < f_1/f_2 \leq 0.8$ (where, $d_4$: distance between the second lens and the third lens on the optical axis, f1: focal distance of the entire lens system, $f_1$: focal distance of the first lens, and $f_2$: focal distance of the second lens) are to be satisfied.

10 Claims, 19 Drawing Sheets

IMAGING LENS

BACKGROUND OF THE INVENTION

1. Field of the Invention

The present invention relates to an imaging lens. In particular, the present invention relates to an imaging lens having a three-lens structure that is capable of size and weight reduction. The imaging lens is used in an image-taking device that uses an image sensor element, such as a charge-coupled device (CCD) and a complementary metal oxide semiconductor (CMOS), mounted on a portable computer, a television phone, a portable phone, and the like.

2. Description of the Related Art

In recent years, there has been an increasing demand for cameras that utilize an image sensor element, such as the CCD, the CMOS, or the like, that is mounted on a portable computer, a television phone, a portable phone, a digital camera, and the like. It is demanded that a camera such as this is small and light because the camera is required to be mounted on a limited installation space.

Therefore, it is also necessary for the imaging lens used in such cameras to be similarly small and light. Conventionally, a single-lens structure lens system using a single lens and a two-lens structure lens system having two lenses have been used as such an imaging lens.

However, although such imaging lenses are extremely effective in reducing the size and weight of the lens system, the imaging lens cannot sufficiently handle high image quality and high resolution required of the imaging lenses in recent years.

Therefore, conventionally, a three-lens structure lens system using three lenses is used to handle high image quality and high resolution.

As examples of such a three-lens structure lens system attempting to enhance image quality and resolution, for example, the lens systems described in the following Patent Literatures 1 to 4 are known.

[Patent Literature 1] Japanese Patent Unexamined Publication 2005-173298

[Patent Literature 2] Japanese Patent Unexamined Publication 2005-91513

[Patent Literature 3] Japanese Patent Unexamined Publication 2003-322792

[Patent Literature 4] Japanese Patent Unexamined Publication 2004-163786

However, in the lens system described in Patent Literature 1, a third lens is a negative lens of which the convex surface faces the object side. Therefore, a balance between aberration correction and size reduction of the lens system is difficult to achieve. In addition, in power distribution of first to third lenses in the lens system described in Patent Literature 1 and a comparison of the center radius curvatures of both surfaces of the first lens, the back focus distance becomes too long. As a result, the overall length of the lens system becomes too long.

As in the lens system described in Patent Literature 1, in the power distribution of first to third lenses in the lens system described in Patent Literature 2, the back focus distance becomes too long. As a result, the overall length of the lens system becomes too long.

Furthermore, in the lens system described in Patent Literature 3, a third lens is a negative lens of which the convex surface faces the object side. Therefore, as in the lens system described in Patent Literature 1, a balance between aberration correction and size reduction of the lens system is difficult to achieve. In addition, in power distribution of first to third lenses in the lens system described in Patent Literature 3, the overall length of the optical system becomes too long. Moreover, in the lens system described in Patent Literature 3, the back focus distance is short and the third lens is a meniscus lens. Therefore, on an optical surface edge, a last surface is shaped to largely protrude toward an image-taking surface side, interfering with insertion of various filters.

Still further, in the power distribution of a first lens, a second lens, and a third lens in the lens system described in Patent Literature 4, the overall length of the lens system becomes too long.

Therefore, the conventional lens system was insufficient for actualizing further size reduction (such as shortening of the overall length) of the lens system itself, while maintaining excellent optical performance, such as high image quality and high resolution.

SUMMARY OF THE INVENTION

The present invention has been achieved in light of the above-described problems. An object of the invention is to provide an imaging lens that can actualize size reduction while maintaining excellent optical performance.

In order to achieve the aforementioned object, an imaging lens according to a first aspect of the present invention is an imaging lens used for forming an image of an object on an image-taking surface of an image sensor element comprising, in order from an object side to an image surface side: a first lens that is a meniscus lens having a positive power whose convex surface faces the object side, a diaphragm, a second lens that is a meniscus lens having a positive power whose convex surface faces the image surface side, and a third lens that is a biconcave lens having a negative power, wherein conditions expressed by the following expressions are to be satisfied:

$$0.023 \leq d_4/fl \leq 0.11 \quad (1)$$

$$0.068 < f_1/f_2 \leq 0.8 \quad (2)$$

where, $d_4$: distance between the second lens and the third lens on the optical axis fl: focal distance of the entire lens system $f_1$: focal distance of the first lens $f_2$: focal distance of the second lens In the first aspect of the invention, the first lens is a meniscus lens having a positive power whose convex surface faces the object side. The second lens is a meniscus lens having a positive power whose convex surface faces the image surface side. The third lens is a biconcave lens having a negative power. The diaphragm is disposed between the first lens and the second lens. In addition, the conditions expressed by the expressions (1) and (2) are satisfied. Therefore, size and weight can be reduced, telecentricity can be secured, excellent optical performance can be maintained, and productivity can be maintained. Moreover, as a result of the shape of the second lens, light rays from surrounding areas can be effectively used.

Productivity, herein, means not only the productivity for mass-producing imaging lenses (such as moldability, easiness of assembly, and cost when imaging lenses are mass-produced by injection molding), but also easiness of processing, manufacture, etc. of equipment used for manufacturing the imaging lenses (such as easiness of processing a mold used for injection molding).

An imaging lens according to a second aspect is the imaging lens according to the first aspect, wherein, further, a condition expressed by a following expression (3) is to be satisfied:

$$1 \leq L/fl \leq 1.3 \tag{3}$$

where,

L: overall length of lens system (distance from the surface of the first lens on the object side to the image-taking surface [equivalent air length])

In the second aspect of the present invention, further, the expression (3) is satisfied. Therefore, the imaging lens can be reduced in size and weight, while maintaining excellent optical performance and productivity.

An imaging lens according to a third aspect is the imaging lens according to the first or second aspect, wherein, further, a condition expressed by a following expression (4) is to be satisfied:

$$0.6 \leq f_1/fl \leq 0.9 \tag{4}$$

In the third aspect of the invention, further, the expression (4) is satisfied. Therefore, the imaging lens can be further reduced in size and weight, while suitably securing the required back focus distance, and productivity can be further improved.

An imaging lens according to a fourth aspect is the imaging lens according to any one of aspects 1 to 3, wherein, further, a condition expressed by a following expression (5) is to be satisfied:

$$-1 \leq f_1/f_3 \leq -0.1 \tag{5}$$

where, $f_3$: focal distance of the third lens

In the fourth aspect of the present invention, further, the expression (5) is satisfied. Therefore, the size and weight can be further reduced, while maintaining excellent optical performance with further certainty.

An imaging lens according to a fifth aspect is the imaging lens according to any one of aspects 1 to 4, wherein, further, a condition expressed by a following expression (6) is to be satisfied:

$$0.12 \leq d_2/fl \leq 0.2 \tag{6}$$

where, $d_2$: distance between the first lens and the second lens on the optical axis In the fifth aspect of the present invention, further, the expression (6) is satisfied. Therefore, the imaging lens can be more effectively reduced in size and weight, while more effectively securing the required back focus distance, and productivity can be further improved.

An imaging lens according to a sixth aspect is the imaging lens according to any one of aspects 1 to 5, wherein, further, a condition expressed by a following expression (7) is to be satisfied:

$$0.01 \leq d_3/fl \leq 0.2 \tag{7}$$

where, $d_3$: center thickness of the second lens

In the sixth aspect of the present invention, further, the expression (7) is satisfied. Therefore, the imaging lens can be more effectively reduced in size and weight, and the productivity can be further improved.

EFFECT OF THE INVENTION

In the imaging lens of the invention, size and weight reduction can be actualized while maintaining excellent optical performance.

In particular, a high-performance imaging lens that is compact and has a short optical length can be actualized.

DETAILED DESCRIPTION OF THE PREFERRED EMBODIMENT

An embodiment of the imaging lens according to the present invention will be described hereinafter with reference to FIG. 1.

Figure 1:
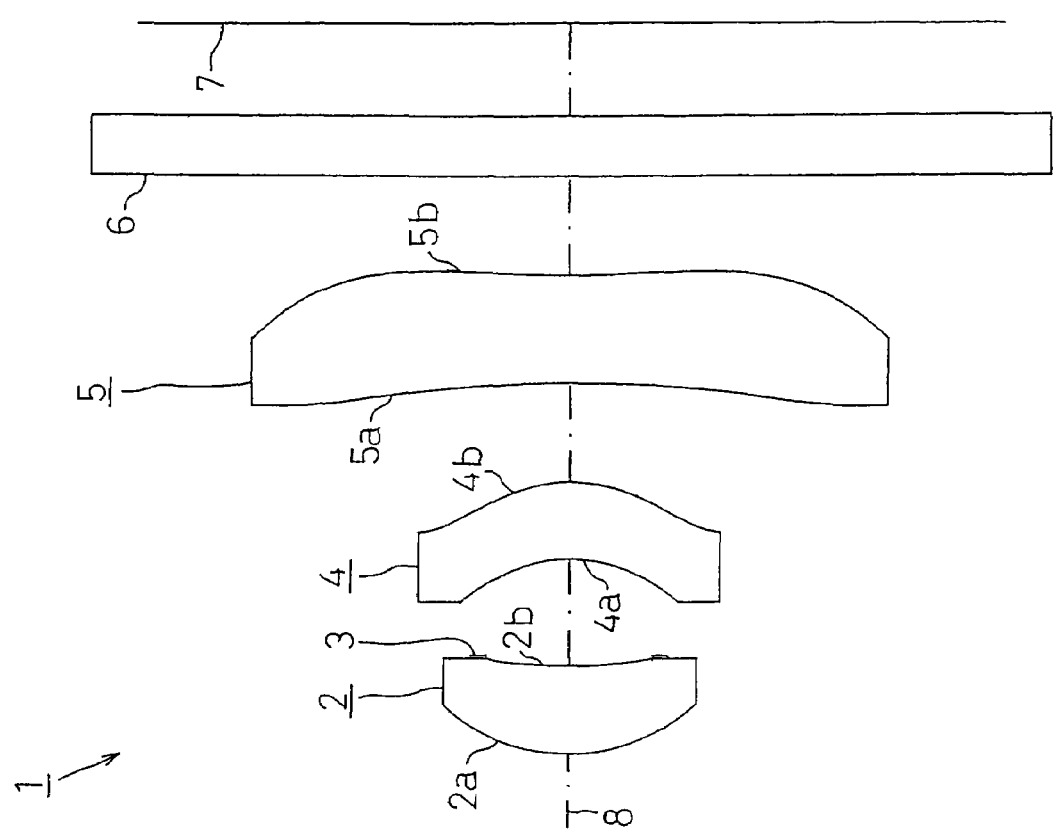
FIG. 1 is a schematic diagram for showing an embodiment of an imaging lens according to the present invention.

As shown in FIG. 1, an imaging lens 1 according to the embodiment comprises, in order from the object side toward the image surface side, a resin-type first lens 2 that is a meniscus lens having a positive power whose convex surface faces the object side, a diaphragm 3, a resin-type second lens 4 that is a meniscus lens having a positive power whose convex surface faces the image surface side, and a resin-type third lens 5 that is a biconcave lens having a negative power. Each lens 2, lens 4, and lens 5 are formed from resin material, such as cyclo-olefin copolymers, cycle-olefin polymers, and polycarbonate, using an injection-molding method.

Hereafter, respective lens surfaces 2a, 4a, and 5a on the object side of the first lens 2, the second lens 4, and the third lens 5 are referred to as first face 2a, first face 4a, and first face 5a of each lens 2, lens 4, and lens 5. Respective lens surfaces 2b, 4b, and 5b on the image surface side of the first lens 2, the second lens 4, and the third lens 5 are referred to as first face 2a, first face 4a, and first face 5a of each lens 2, lens 4, and lens 5.

On the second face 5b of the third lens 5, there are respectively disposed various filters 6, such as a cover glass, an infrared (IR) cut filter, and a lowpass filter, and an image-taking surface 7 that is a light-receiving surface of an image sensor element, such as a CCD or a CMOS. The various filters 6 may be omitted as required.

According to the embodiment, the first lens satisfies conditions expressed by the following expressions (1) and (2):

$$0.023 \leq d_4/fl \leq 0.11 \quad (1)$$

$$0.068 < f_1/f_2 \leq 0.8 \quad (2)$$

where, $d_4$ in the expression (1) is the distance between the second lens 4 and the third lens 5 on an optical axis 8 (the same applies hereafter). fl in the expression (1) is the focal distance of the entire lens system (the same applies hereafter). $f_1$ in the expression (2) is the focal distance of the first lens 2 (the same applies hereafter). $f_2$ in the expression (2) is the focal distance of the second lens 4 (the same applies hereafter).

When the shape of each lens 2, lens 4, and lens 5 is not the shape described according to the embodiment, it becomes difficult to maintain telecentricity and optical performance, while keeping the optical system short.

When the value of $d_4/fl$ is greater than the value (0.11) in the expression (1), the height of the light ray passing through the second face 5b of the third lens 5 becomes too high. Therefore, the third lens 5 increases in size and weight, and production becomes difficult. Furthermore, the required back focus distance becomes difficult to secure.

At the same time, when the value of $d_4/fl$ is less than the value (0.023) in the expression (1), it becomes difficult to insert the diaphragm that effectively limits the amount of light.

When the value of $f_1/f_2$ is greater than the value (0.8) in the expression (2), the power of the first lens 2 becomes relatively too weak. Therefore, size and weight reduction of the optical system becomes difficult. The power balance between the first lens 2 and the second lens 4 becomes poor, and the optical performance deteriorates.

At the same time, when the value of $f_1/f_2$ is equal to or less than the value (0.068) in the expression (2), the power of the first lens 2 becomes relatively too strong. Therefore, the productivity declines. Either the first lens 2 or the second lens 4 has a negative power, and the desired optical performance cannot be achieved. Furthermore, the power balance between the first lens 2 and the second lens 4 becomes poor, and the optical performance deteriorates.

According to the embodiment, the first lens 2 is a meniscus lens having a positive power whose convex surface faces the object side. The second lens 4 is a meniscus lens having a positive power whose convex surface faces the image surface side. The third lens 5 that is a biconcave lens having a negative power. The diaphragm 3 is disposed between the first lens 2 and the second lens 4. In addition, the conditions expressed by the expressions (1) and (2) are satisfied. Therefore, the size and weight can be reduced, the telecentricity can be secured, excellent optical performance can be maintained, and the productivity can be maintained. Moreover, as a result of the shape of the second lens 4, light rays from surrounding areas can be effectively used.

The relationship between $d_4$ and fl is more preferably $0.05 \leq d_4/fl \leq 0.11$.

The relationship between $f_1$ and $f_2$ is more preferably $0.12 < f_1/f_2 \leq 0.55$.

In addition to the above-described configuration, according to the embodiment, a condition expressed by a following expression (3) is satisfied:

$$1 \leq L/fl \leq 1.3 \quad (3)$$

where, L in the expression (3) is the overall length of lens system, or in other words, the distance from the first face 2a of the first lens 2 to the image-taking surface 7 (equivalent air length) (the same applies hereafter).

When the value of L/fl is greater than the value (1.3) in the expression (3), the entire optical system becomes too large.

At the same time, when the value of L/fl is less than the value (1) in the expression (3), the entire optical system becomes too small. Therefore, the productivity declines, and the optical performance becomes difficult to maintain.

Therefore, according to the embodiment, by the value of L/fl being set to satisfy the expression (3), the imaging lens can be further reduced in size and weight, while maintaining excellent optical performance and productivity with further certainty.

The relationship between L and fl is more preferably $1.15 \leq L/fl \leq 1.3$.

In addition to the above-described configuration, according to the embodiment, a condition expressed by a following expression (4) is satisfied:

$$0.6 \leq f_1/fl \leq 0.9 \quad (4)$$

When the value of $f_1/fl$ is greater than the value (0.9) in the expression (4), the back focus distance becomes too long. Therefore, the size reduction of the optical system becomes difficult.

At the same time, when the value of $f_1/fl$ is less than the value (0.6) in the expression (4), the power of the first lens 2 becomes too strong. Therefore, the productivity declines. The required back focus distance also becomes difficult to secure.

Therefore, according to the embodiment, by the value of $f_1/fl$ being set to satisfy the expression (4), the imaging lens 1 can be more effectively reduced in size and weight and productivity can be further improved, while securing the required back focus distance.

The relationship between $f_1$ and fl is more preferably $0.65 \leq f_1/fl \leq 0.85$.

In addition to the above-described configuration, according to the embodiment, a condition expressed by a following expression (5) is satisfied:

$$-1 \leq f_1/f_3 \leq -0.1 \quad (5)$$

where, $f_3$ in the expression (5) is the focal distance of the third lens 5 (the same applies hereafter).

When the value of $f_1/f_3$ is greater than the value (−0.1) in the expression (5), the power of the first lens 2 becomes too strong. Therefore, productivity declines. The power balance between the first lens 2 and the third lens 5 cannot be achieved, and the optical performance cannot be maintained.

At the same time, when the value of $f_1/f_3$ is less than the value (−1) in the expression (5), the power of the third lens 5 becomes relatively too strong. Therefore, the size reduction of the optical system becomes difficult. The power balance between the first lens 2 and the third lens 5 becomes poor, and the optical performance deteriorates.

Therefore, according to the embodiment, by the value of $f_1/f_3$ being set to satisfy the expression (5), the size and weight can be further reduced, while maintaining excellent optical performance with further certainty.

The relationship between $f_1$ and $f_3$ is more preferably $-0.85 \leq f_1/f_3 \leq -0.25$.

In addition to the above-described configuration, according to the embodiment, a condition expressed by a following expression (6) is satisfied:

$$0.12 \leq d_2/fl \leq 0.2 \quad (6)$$

where, $d_2$ in the expression (6) is the distance between the first lens 2 and the second lens 4 on the optical axis 8 (the same applies hereafter).

When the value of $d_2/fl$ is greater than the value (0.2) in the expression (6), the required back focus distance becomes difficult to secure. The height of the light ray passing through the second face 5b of the third lens 5 becomes too high. Therefore, the third lens 5 increases in size and weight, and production becomes difficult.

At the same time, when the value of $d_2/fl$ is less than the value (0.12) in the expression (6), the back focus distance becomes too long. Therefore, the size reduction of the entire optical system becomes difficult. In addition, it becomes difficult to insert the diaphragm that effectively limits the amount of light.

Therefore, according to the embodiment, by the value of the $d_2/fl$ being set to satisfy the expression (6), the imaging lens 1 can be more effectively reduced in size and weight, while more effectively securing the required back focus distance, and productivity can be further improved.

The relationship between $d_2$ and fl is more preferably $0.14 \leq d_2/fl \leq 0.185$.

In addition to the above-described configuration, according to the embodiment, a condition expressed by a following expression (7) is satisfied:

$$0.01 \leq d_3/fl \leq 0.2 \quad (7)$$

where, $d_3$ in the expression (7) is the center thickness of the second lens 4 (the same applies hereafter).

When the value of $d_3/fl$ is greater than the value (0.2) in the expression (7), the back focus distance becomes too long. Therefore, the size reduction of the entire optical system becomes difficult. The height of the light ray passing through the second face 5b of the third lens 5 becomes too high. Therefore, the third lens 5 increases in size and weight, and production becomes difficult.

At the same time, when the value of $d_3/fl$ is less than the value (0.01) in the expression (7), the production of the second lens 4 becomes difficult.

Therefore, according to the embodiment, by the value of the $d_3/fl$ being set to satisfy the expression (7), the imaging lens 1 can be more effectively reduced in size and weight, and the productivity can be further improved.

The relationship between $d_3$ and fl is more preferably $0.1 \leq d_3/fl \leq 0.145$.

EXAMPLES

Next, EXAMPLES of the present invention will be described with reference to FIG. 2 to FIG. 19.

In the EXAMPLES, F no denotes F number, ω denotes half of the angle-of-view, and r denotes the center radius curvature. In addition, c denotes a center curvature. Further, d denotes a distance to the next optical surface, nd denotes the index of refraction of the d line, and vd denotes the Abbe number (based on d line).

k, A, B, C, and D denote each coefficient in a following expression (8). Specifically, the shape of the aspherical surface of the lens is expressed by the following expression provided that the direction of the optical axis 8 is taken as the Z axis, the direction orthogonal to the optical axis 8 as the X axis, the traveling direction of light is positive, k is the constant of cone, A, B, C, and D are the aspherical coefficients, and r is the center radius curvature.

$$Z(X) = r^{-1}X^2/[1+\{1-(k+1)r^{-2}X^2\}^{1/2}]+AX^4+BX^6+CX_8+DX^{10} \quad (8)$$

In the following EXAMPLES, reference code E used for a numerical value denoting the constant of cone and the aspherical coefficient indicates that the numerical value following E is an exponent having 10 as the base and that the numerical value before E indicates is multiplied by the numerical value denoted by the exponent having 10 as the base. For example, −8.0E−1 denotes $-8.0 \times 10^{-1}$.

First Example

Figure 2:
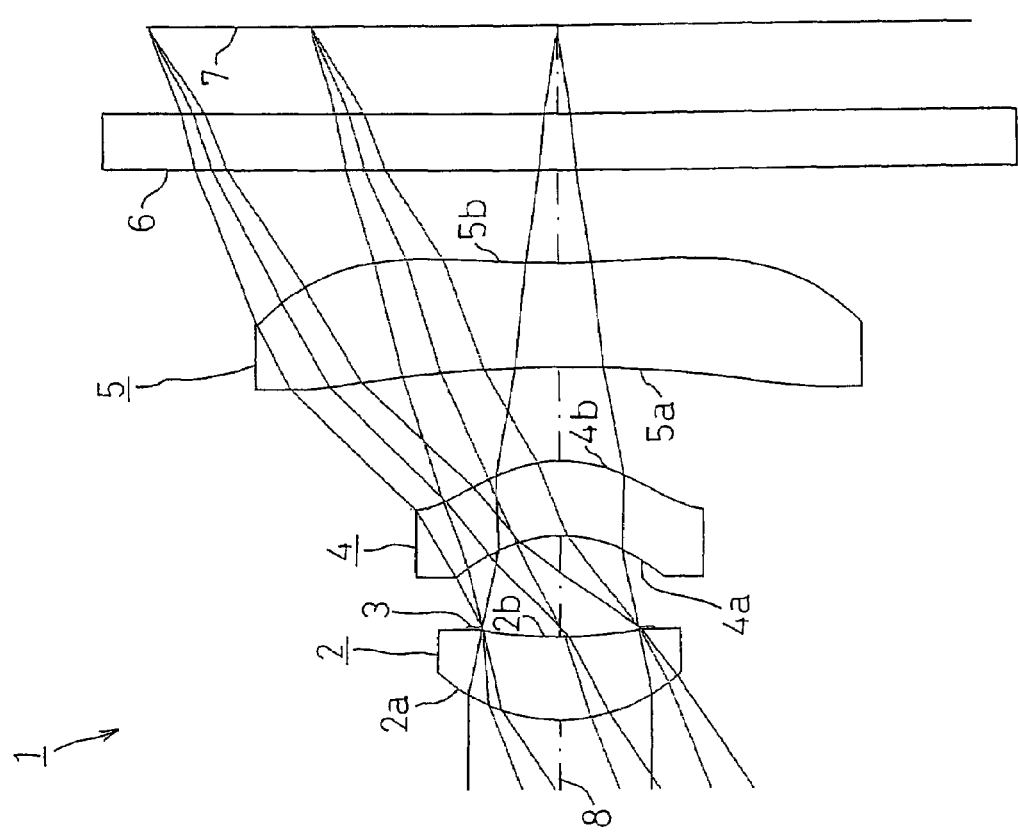
FIG. 2 is a schematic diagram for showing a FIRST EXAMPLE of the imaging lens according to the present invention.

FIG. 2 shows a FIRST EXAMPLE of the present invention. The imaging lens 1 according to the FIRST EXAMPLE shown in FIG. 2 is the same imaging lens 1 as that shown in FIG. 1.

The imaging lens 1 of the FIRST EXAMPLE was set under the following conditions:

Lens Data
F no = 3.25, ω = 35°, L = 4.05 mm, fl = 3.26 mm, $f_1$ = 2.72 mm, $f_2$ = 5.94 mm, $f_3$ = −6.53 mm

| Face Number | c | (r) | d | nd | vd |
|---|---|---|---|---|---|
| (Object Point) | | | | | |
| 1 (First Face of First Lens) | 0.77 | (1.30) | 0.63 | 1.5310 | 56.0 |
| 2 (Second Face of First Lens) | 0.096 | (10.45) | 0.06 | | |
| 3 (Diaphragm) | 0.00 | | 0.52 | | |
| 4 (First Face of Second Lens) | −1.52 | (−0.66) | 0.46 | 1.5310 | 56.0 |
| 5 (Second Face of Second Lens) | −1.43 | (−0.70) | 0.12 | | |
| 6 (First Face of Third Lens) | −0.087 | (−11.50) | 0.81 | 1.5310 | 56.0 |
| 7 (Second Face of Third Lens) | 0.196 | (5.11) | 0.50 | | |
| 8 (First Face of Cover Glass) | 0.00 | | 0.30 | 1.5168 | 64.2 |
| 9 (Second Face of Cover Glass) | 0.00 | | | | |
| (Image Surface) | | | | | |

| Face Number | k | A | B | C | D |
|---|---|---|---|---|---|
| 1 | −6.3E−1 | 2.8E−2 | −7.1E−2 | 1.7E−1 | −3.5E−1 |
| 2 | 0 | −8.3E−2 | −2.6E−1 | 7.0E−2 | 0 |
| 4 | −1.1E−1 | 5.0E−2 | 1.3 | 6.0E−1 | 0 |
| 5 | −7.2E−1 | 2.9E−1 | 6.5E−3 | 1.0 | −8.0E−1 |
| 6 | −0.7 | 9.5E−2 | −6.0E−2 | 2.1E−2 | −2.7E−3 |
| 7 | 1.6E+2 | −1.2E−1 | 6.7E−2 | −2.4E−2 | 3.3E−3 |

Under such conditions, $d_4/fl=0.035$ was achieved, thereby satisfying the expression (1). $f_1/f_2=0.458$ was achieved, thereby satisfying the expression (2). $L/fl=1.24$ was achieved, thereby satisfying the expression (3). $f_1/fl=0.833$ was achieved, thereby satisfying the expression (4). $f_1/f_3=-0.416$ was achieved, thereby satisfying the expression (5). $d_2/fl=0.176$ was achieved, thereby satisfying the expression (6). $d_3/fl=0.141$ was achieved, thereby satisfying the expression (7).

Figure 3:
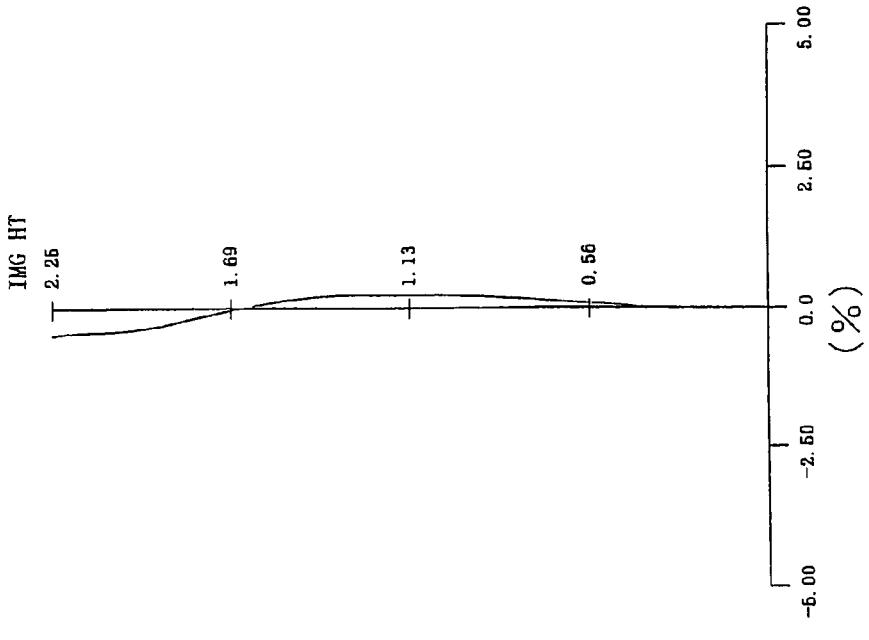
FIG. 3 shows graphs for describing the astigmatism and distortion of the imaging lens shown in FIG. 2.
Figure 3:
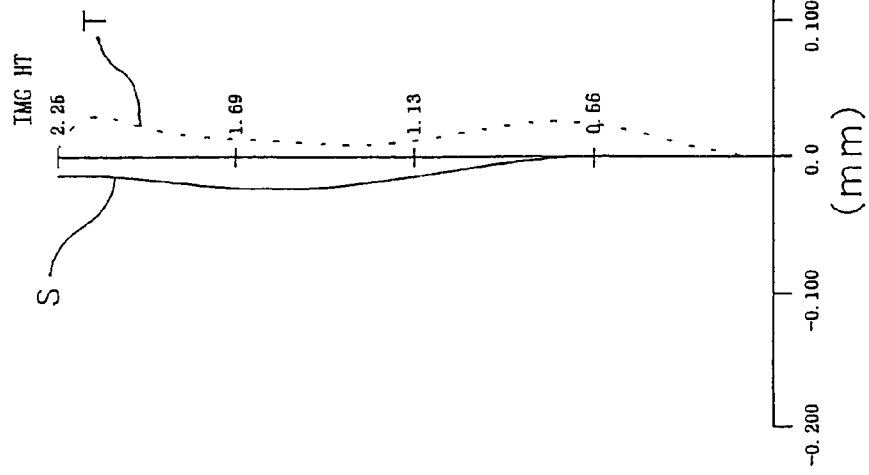

FIG. 3 shows the astigmatism and the distortion in the imaging lens 1 of the FIRST EXAMPLE.

According to the result, each of the astigmatism and the distortion was satisfied. It can be seen from the result that a sufficiently excellent optical property can be obtained.

Second Example

Figure 4:
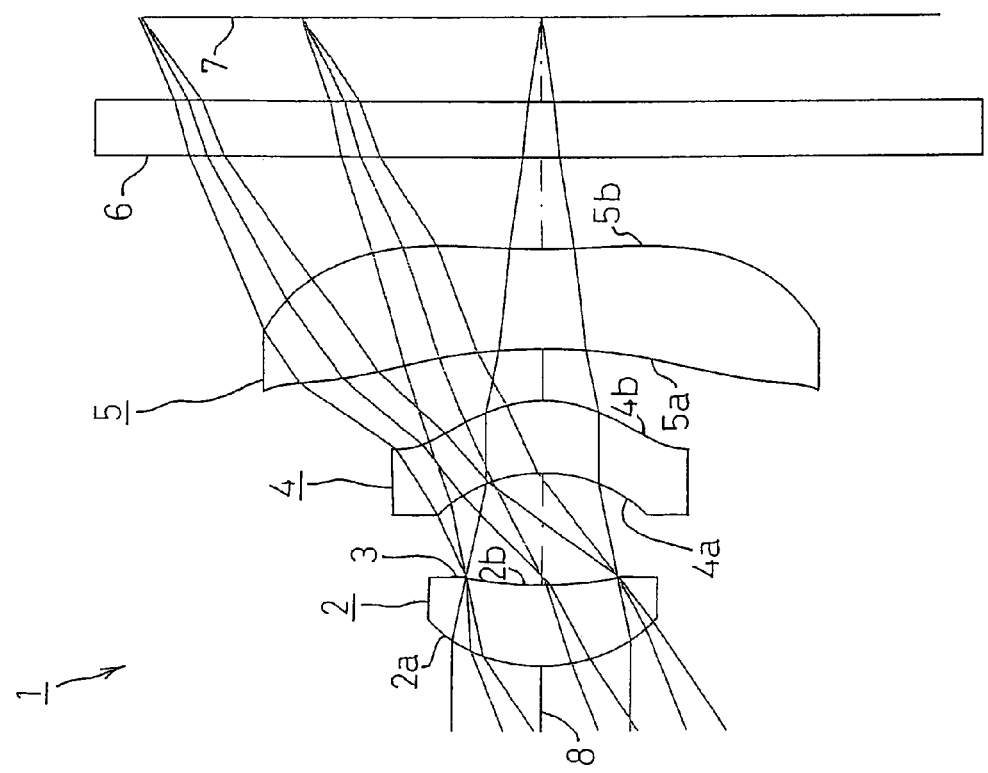
FIG. 4 is a schematic diagram for showing a SECOND EXAMPLE of the imaging lens according to the present invention.

FIG. 4 shows a SECOND EXAMPLE of the present invention. The imaging lens 1 of the SECOND EXAMPLE shown in FIG. 4 was set under the following conditions:

Lens Data
F no = 3.25, ω = 34°, L = 3.46 mm, fl = 3.25 mm, $f_1$ = 2.64 mm, $f_2$ = 4.82 mm, $f_3$ = −3.29 mm

| Face Number | c | (r) | d | nd | vd |
|---|---|---|---|---|---|
| (Object Point) | | | | | |
| 1 (First Face of First Lens) | 1.03 | (0.96) | 0.45 | 1.5310 | 56.0 |
| 2 (Second Face of First Lens) | 0.39 | (2.54) | 0.05 | | |
| 3 (Diaphragm) | 0.00 | | 0.57 | | |
| 4 (First Face of Second Lens) | −1.17 | (−0.85) | 0.40 | 1.5310 | 56.0 |
| 5 (Second Face of Second Lens) | −1.34 | (−0.74) | 0.27 | | |
| 6 (First Face of Third Lens) | −0.30 | (−3.31) | 0.55 | 1.5310 | 56.0 |
| 7 (Second Face of Third Lens) | 0.25 | (3.95) | 0.50 | | |
| 8 (First Face of Cover Glass) | 0.00 | | 0.30 | 1.5168 | 64.2 |
| 9 (Second Face of Cover Glass) | 0.00 | | | | |
| (Image Surface) | | | | | |

| Face Number | k | A | B | C | D |
|---|---|---|---|---|---|
| 1 | −7.7E−1 | 9.7E−2 | 4.9E−1 | −1.1 | 1.9 |
| 2 | 0 | 1.1E−1 | −6.9E−2 | 7.5E−1 | 0 |
| 4 | 6.9E−1 | 1.2E−1 | 4.4E−1 | 1.4 | 0 |
| 5 | −5.5E−1 | 3.6E−1 | −2.8E−1 | 1.8 | −1.3 |
| 6 | 0 | 2.4E−3 | 9.2E−3 | 1.1E−2 | −4.6E−3 |
| 7 | −1.3E+2 | −1.1E−1 | 3.2E−2 | −1.0E−2 | 5.4E−4 |

Under such conditions, $d_4/fl=0.084$ was achieved, thereby satisfying the expression (1). $f_1/f_2=0.547$ was achieved, thereby satisfying the expression (2). $L/fl=1.06$ was achieved, thereby satisfying the expression (3). $f_1/fl=0.812$ was achieved, thereby satisfying the expression (4). $f_1/f_3=-0.801$ was achieved, thereby satisfying the expression (5). $d_2/fl=0.191$ was achieved, thereby satisfying the expression (6). $d_3/fl=0.123$ was achieved, thereby satisfying the expression (7).

Figure 5:
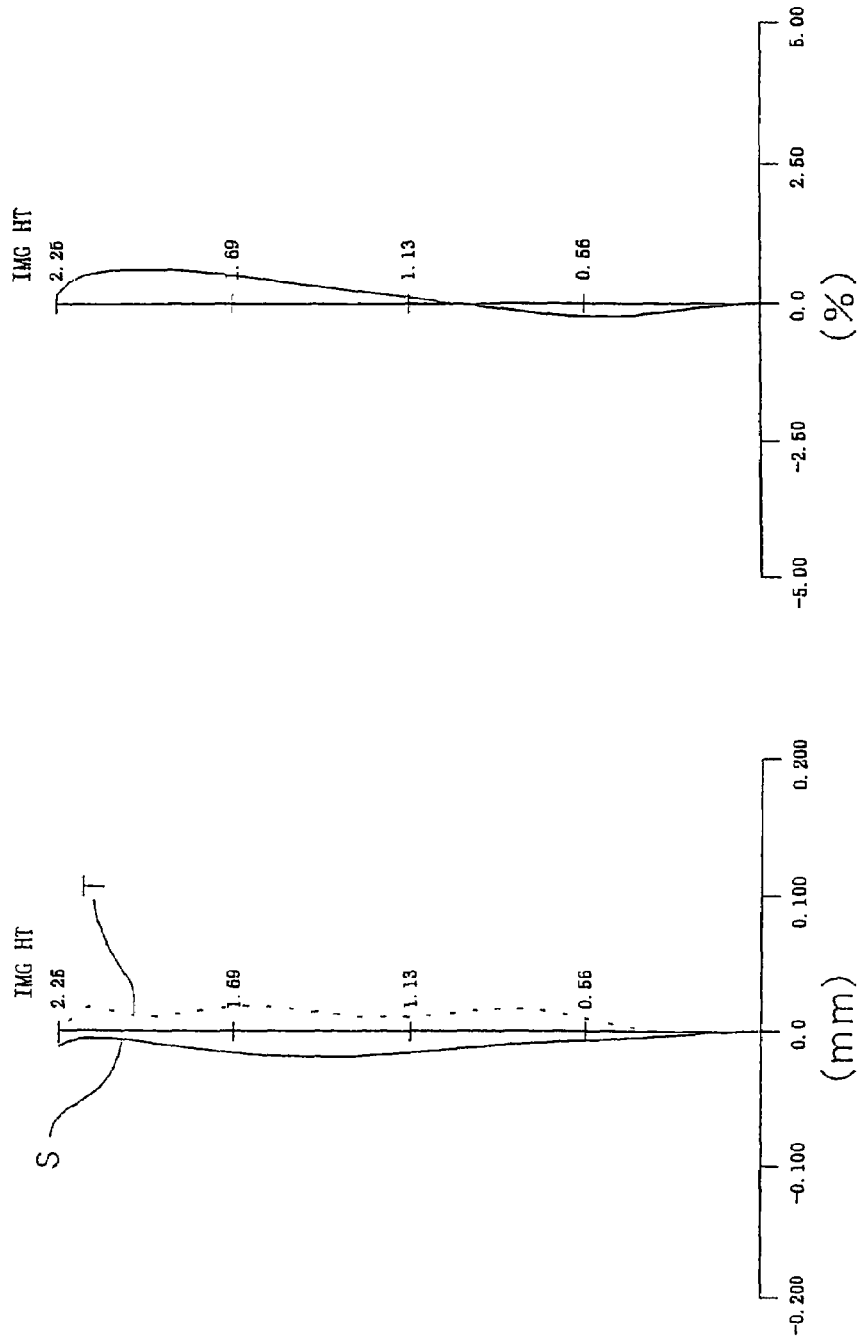
FIG. 5 shows graphs for describing the astigmatism and distortion of the imaging lens shown in FIG. 4.

FIG. 5 shows the astigmatism and the distortion in the imaging lens 1 of the SECOND EXAMPLE.

According to the result, each of the astigmatism and the distortion was satisfied. It can be seen from the result that a sufficiently excellent optical property can be obtained.

Third Example

Figure 6:
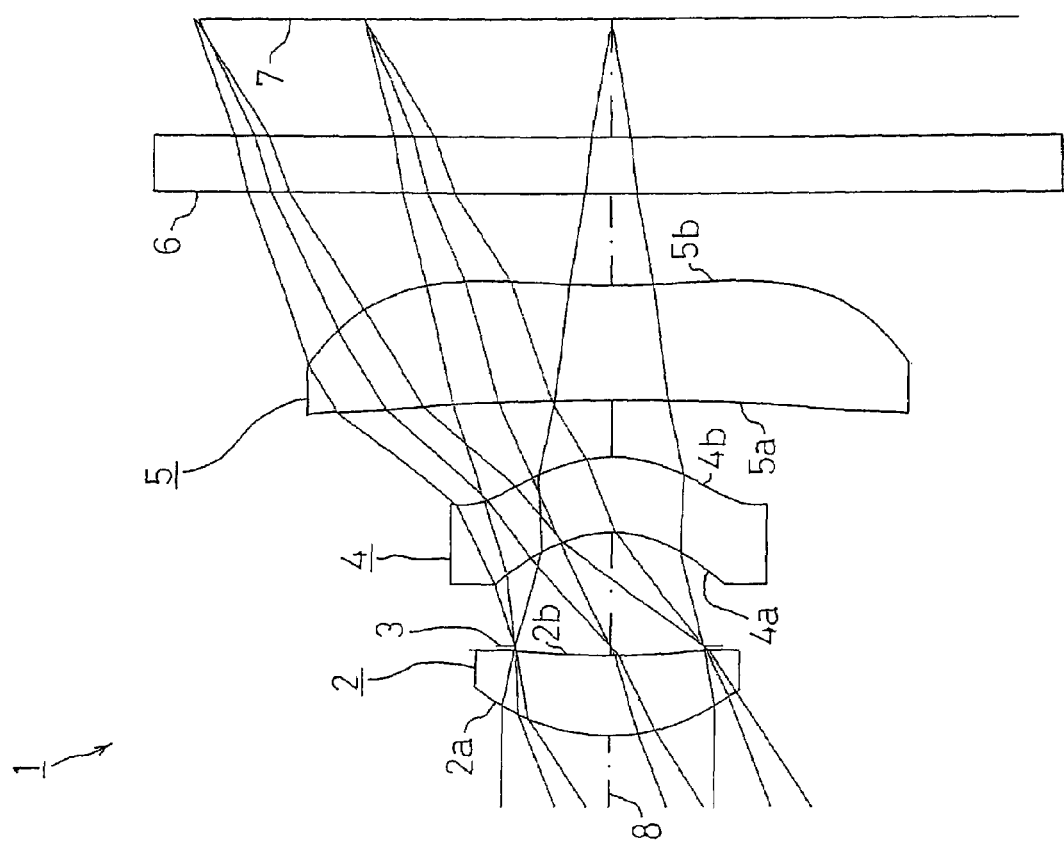
FIG. 6 is a schematic diagram for showing a THIRD EXAMPLE of the imaging lens according to the present invention.

FIG. 6 shows a THIRD EXAMPLE of the present invention. The imaging lens 1 of the THIRD EXAMPLE shown in FIG. 6 was set under the following conditions:

Lens Data
F no = 2.85, ω = 34°, L = 3.7 mm, fl = 3.3 mm, $f_1$ = 2.67 mm, $f_2$ = 9 mm, $f_3$ = −5.95 mm

| Face Number | c | (r) | d | nd | vd |
|---|---|---|---|---|---|
| (Object Point) | | | | | |
| 1 (First Face of First Lens) | 0.89 | (1.12) | 0.43 | 1.5310 | 56.0 |
| 2 (Second Face of First Lens) | 0.21 | (4.61) | 0.05 | | |
| 3 (Diaphragm) | 0.00 | | 0.60 | | |
| 4 (First Face of Second Lens) | −1.34 | (−0.74) | 0.40 | 1.5850 | 30.0 |
| 5 (Second Face of Second Lens) | −1.27 | (−0.78) | 0.30 | | |
| 6 (First Face of Third Lens) | −0.05 | (−19.87) | 0.59 | 1.5310 | 56.0 |
| 7 (Second Face of Third Lens) | 0.26 | (3.81) | 0.50 | | |
| 8 (First Face of Cover Glass) | 0.00 | | 0.30 | 1.5168 | 64.2 |
| 9 (Second Face of Cover Glass) | 0.00 | | | | |
| (Image Surface) | | | | | |

| Face Number | k | A | B | C | D |
|---|---|---|---|---|---|
| 1 | −6.7E−1 | 4.6E−2 | 6.7E−2 | 4.0E−2 | −3.5E−1 |
| 2 | 0 | −1.5E−2 | −3.7E−2 | −2.8E−1 | 0 |
| 4 | 6.2E−2 | 1.5E−1 | 9.8E−1 | 2.0E−1 | 0 |
| 5 | −6.4E−1 | 2.7E−1 | 6.7E−3 | 1.0 | −7.5E−1 |
| 6 | 0 | 1.2E−2 | −4.1E−2 | 2.5E−2 | −4.6E−3 |
| 7 | −7.7E+1 | −8.7E−2 | 1.9E−2 | −8.7E−3 | 1.0E−3 |

Under such conditions, $d_4/fl=0.093$ was achieved, thereby satisfying the expression (1). $f_1/f_2=0.297$ was achieved, thereby satisfying the expression (2). $L/fl=1.12$ was achieved, thereby satisfying the expression (3). $f_1/fl=0.809$ was achieved, thereby satisfying the expression (4). $f_1/f_3=-0.449$ was achieved, thereby satisfying the expression (5). $d_2/fl=0.199$ was achieved, thereby satisfying the expression (6). $d_3/fl=0.121$ was achieved, thereby satisfying the expression (7).

Figure 7:
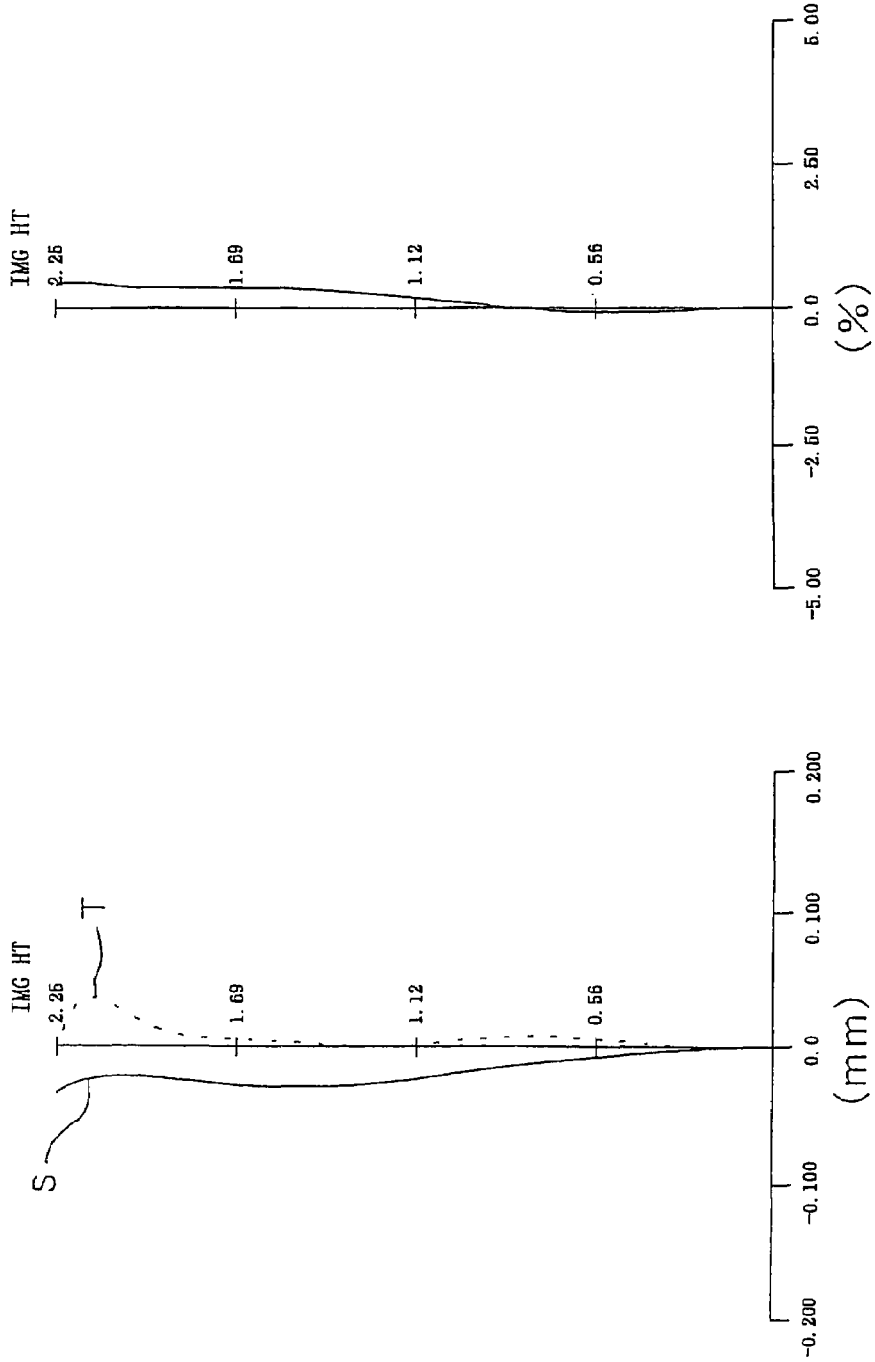
FIG. 7 shows graphs for describing the astigmatism and distortion of the imaging lens shown in FIG. 6.

FIG. 7 shows the astigmatism and the distortion in the imaging lens 1 of the THIRD EXAMPLE.

According to the result, each of the astigmatism and the distortion was satisfied. It can be seen from the result that a sufficiently excellent optical property can be obtained.

Fourth Example

Figure 8:
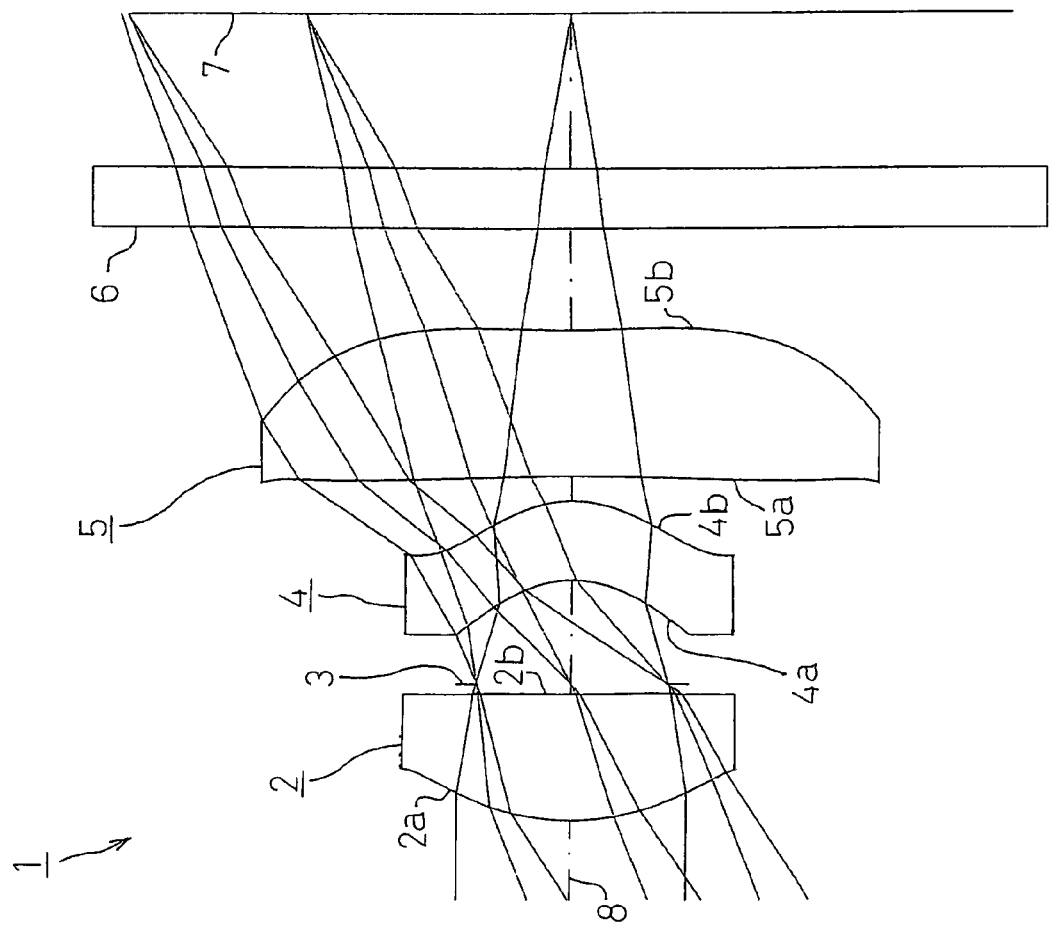
FIG. 8 is a schematic diagram for showing a FOURTH EXAMPLE of the imaging lens according to the present invention.

FIG. 8 shows a FOURTH EXAMPLE of the present invention. The imaging lens 1 of the FOURTH EXAMPLE shown in FIG. 8 was set under the following conditions:

Lens Data
F no = 2.85, ω = 34°, L = 3.88 mm, fl = 3.29 mm, $f_1$ = 2.61 mm, $f_2$ = 7.04 mm, $f_3$ = −5.95 mm

| Face Number | c | (r) | d | nd | vd |
|---|---|---|---|---|---|
| (Object Point) | | | | | |
| 1 (First Face of First Lens) | 0.80 | (1.25) | 0.63 | 1.5310 | 56.0 |
| 2 (Second Face of First Lens) | 0.10 | (10) | 0.05 | | |
| 3 (Diaphragm) | 0.00 | | 0.53 | | |
| 4 (First Face of Second Lens) | −1.60 | (−0.63) | 0.39 | 1.5850 | 30.0 |
| 5 (Second Face of Second Lens) | −1.49 | (−0.67) | 0.12 | | |
| 6 (First Face of Third Lens) | −0.10 | (−9.52) | 0.72 | 1.5310 | 56.0 |
| 7 (Second Face of Third Lens) | 0.20 | (4.88) | 0.50 | | |

-continued

| | | | | |
|---|---|---|---|---|
| 8 (First Face of Cover Glass) | 0.00 | | 0.30 | 1.5168 | 64.2 |
| 9 (Second Face of Cover Glass) (Image Surface) | 0.00 | | | | |

| Face Number | k | A | B | C | D |
|---|---|---|---|---|---|
| 1 | −6.5E−1 | 1.8E−2 | −3.6E−2 | 9.8E−2 | −3.3E−1 |
| 2 | 0 | −8.8E−2 | −2.9E−1 | 1.0E−1 | 0 |
| 4 | −1.8E−1 | 1.5E−1 | 1.7 | 3.7E−1 | 0 |
| 5 | −8.2E−1 | 3.1E−1 | 8.6E−2 | 1.3 | −1.3 |
| 6 | 0 | 7.2E−2 | −7.7E−2 | 4.3E−2 | −8.5E−3 |
| 7 | −2.1E+2 | −1.4E−1 | 7.0E−2 | −2.9E−2 | 4.1E−3 |

Under such conditions, $d_4/fl=0.036$ was achieved, thereby satisfying the expression (1). $f_1/f_2=0.371$ was achieved, thereby satisfying the expression (2). $L/fl=1.18$ was achieved, thereby satisfying the expression (3). $f_1/fl=0.795$ was achieved, thereby satisfying the expression (4). $f_1/f_3=-0.440$ was achieved, thereby satisfying the expression (5). $d_2/fl=0.176$ was achieved, thereby satisfying the expression (6). $d_3/fl=0.119$ was achieved, thereby satisfying the expression (7).

Figure 9:
FIG. 9 shows graphs for describing the astigmatism and distortion of the imaging lens shown in FIG. 8.
Figure 9:
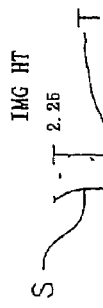

FIG. 9 shows the astigmatism and the distortion in the imaging lens 1 of the FOURTH EXAMPLE.

According to the result, each of the astigmatism and the distortion was satisfied. It can be seen from the result that a sufficiently excellent optical property can be obtained.

Fifth Example

Figure 10:
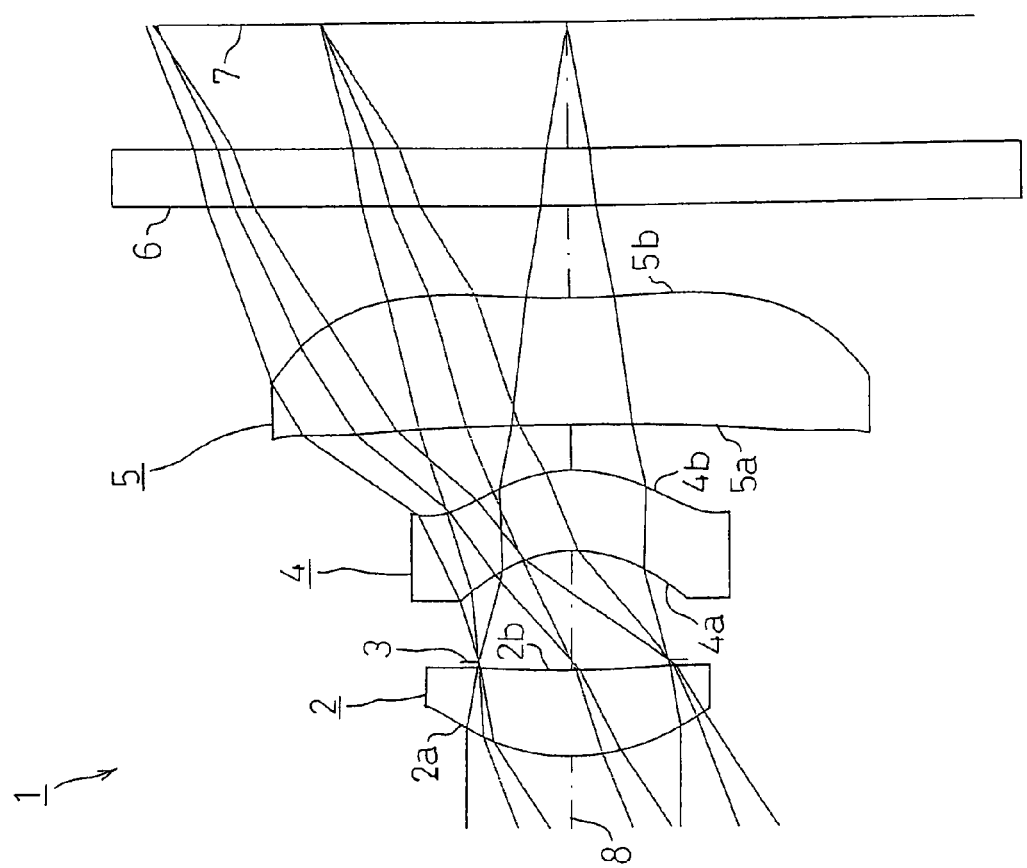
FIG. 10 is a schematic diagram for showing a FIFTH EXAMPLE of the imaging lens according to the present invention.

FIG. 10 shows a FIFTH EXAMPLE of the present invention. The imaging lens 1 of the FIFTH EXAMPLE shown in FIG. 10 was set under the following conditions:

Lens Data
F no = 2.85, ω = 34°, L = 3.8 mm, fl = 3.35 mm, $f_1$ = 2.63 mm, $f_2$ = 10.38 mm, $f_3$ = −6.4 mm

| Face Number | c | (r) | d | nd | vd |
|---|---|---|---|---|---|
| (Object Point) | | | | | |
| 1 (First Face of First Lens) | 0.86 | (1.15) | 0.46 | 1.5310 | 56.0 |
| 2 (Second Face of First Lens) | 0.17 | (5.73) | 0.05 | | |
| 3 (Diaphragm) | 0.00 | | 0.59 | | |
| 4 (First Face of Second Lens) | −1.34 | (−0.74) | 0.43 | 1.5850 | 30.0 |
| 5 (Second Face of Second Lens) | −1.24 | (−0.81) | 0.23 | | |
| 6 (First Face of Third Lens) | −0.04 | (−21.28) | 0.66 | 1.5310 | 56.0 |
| 7 (Second Face of Third Lens) | 0.24 | (4.11) | 0.50 | | |
| 8 (First Face of Cover Glass) | 0.00 | | 0.30 | 1.5168 | 64.2 |
| 9 (Second Face of Cover Glass) (Image Surface) | 0.00 | | | | |

| Face Number | k | A | B | C | D |
|---|---|---|---|---|---|
| 1 | −6.6E−1 | 4.5E−2 | −4.1E−2 | 2.5E−1 | −6.1E−1 |
| 2 | 0 | −4.1E−2 | −6.8E−2 | −2.9E−1 | 0 |
| 4 | 4.7E−2 | 1.9E−1 | 9.1E−1 | 1.2E−1 | 0 |
| 5 | −6.5E−1 | 3.0E−1 | −3.2E−2 | 9.4E−1 | −7.0E−1 |
| 6 | 0 | 6.5E−3 | −3.9E−2 | 2.9E−2 | −6.0E−3 |
| 7 | −7.9E+1 | −1.0E−1 | 3.5E−2 | −1.5E−2 | 2.0E−3 |

Under such conditions, $d_4/fl=0.071$ was achieved, thereby satisfying the expression (1). $f_1/f_2=0.253$ was achieved, thereby satisfying the expression (2). $L/fl=1.13$ was achieved, thereby satisfying the expression (3). $f_1/fl=0.784$ was achieved, thereby satisfying the expression (4). $f_1/f_3=-0.410$ was achieved, thereby satisfying the expression (5). $d_2/fl=0.191$ was achieved, thereby satisfying the expression (6). $d_3/fl=0.128$ was achieved, thereby satisfying the expression (7).

Figure 11:
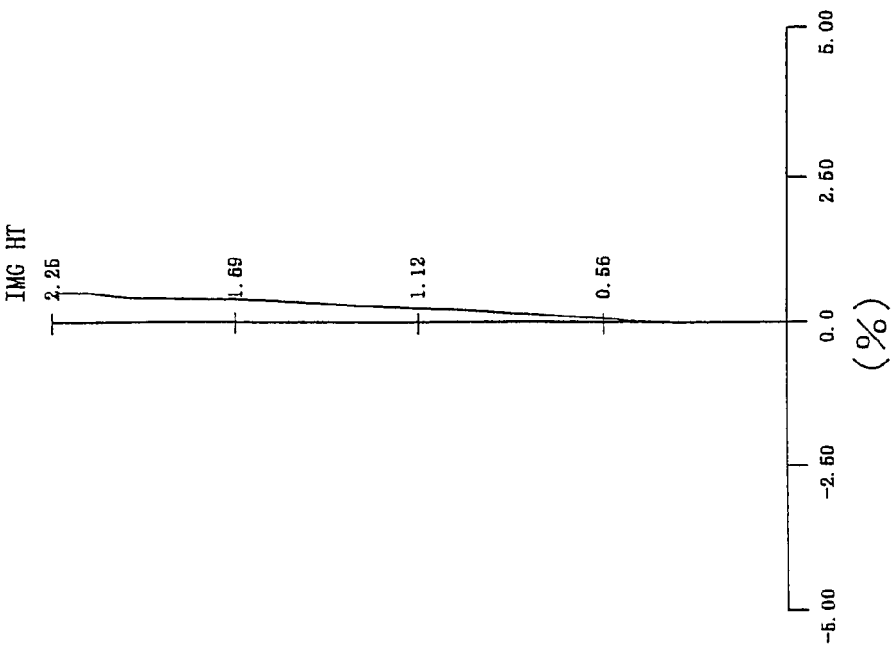
FIG. 11 shows graphs for describing the astigmatism and distortion of the imaging lens shown in FIG. 10.
Figure 11:
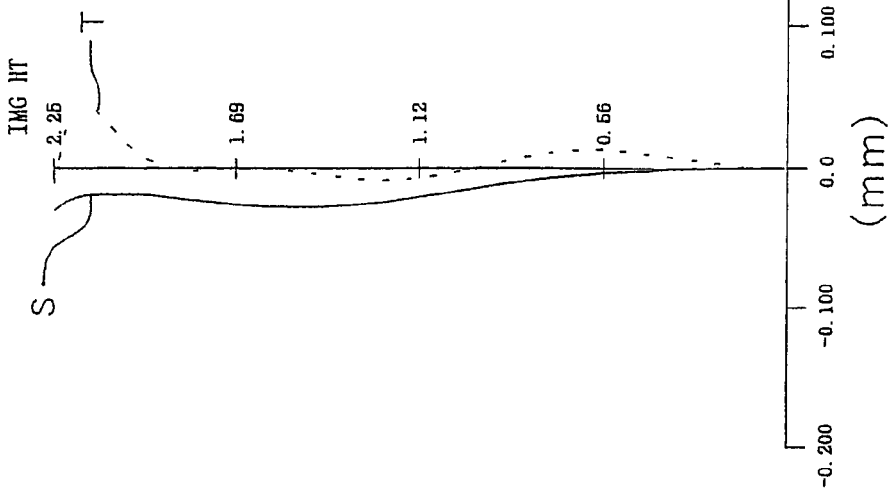

FIG. 11 shows the astigmatism and the distortion in the imaging lens 1 of the FIFTH EXAMPLE.

According to the result, each of the astigmatism and the distortion was satisfied. It can be seen from the result that a sufficiently excellent optical property can be obtained.

Sixth Example

Figure 12:
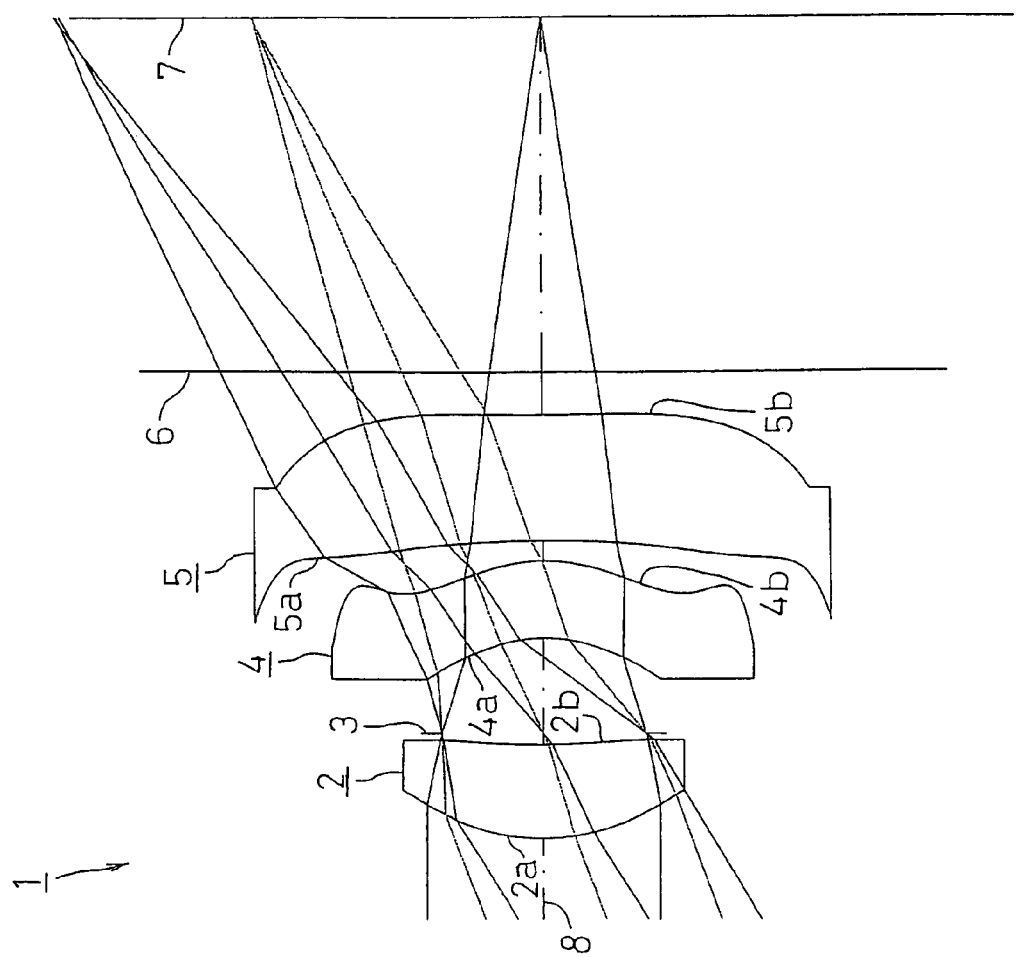
FIG. 12 is a schematic diagram for showing a SIXTH EXAMPLE of the imaging lens according to the present invention.

FIG. 12 shows a SIXTH EXAMPLE of the present invention. The imaging lens 1 of the SIXTH EXAMPLE shown in FIG. 12 was set under the following conditions:

Lens Data
F no = 3.25, ω = 32°, L = 3.74 mm, fl = 3.49 mm, $f_1$ = 2.39 m, $f_2$ = 34.74 mm, $f_3$ = −6.73 mm

| Face Number | c | (r) | d | nd | vd |
|---|---|---|---|---|---|
| (Object Point) | | | | | |
| 1 (First Face of First Lens) | 1.00 | (1.00) | 0.43 | 1.5310 | 56.0 |
| 2 (Second Face of First Lens) | 0.26 | (3.92) | 0.05 | | |
| 3 (Diaphragm) | 0.00 | | 0.45 | | |
| 4 (First Face of Second Lens) | −1.41 | (−0.71) | 0.35 | 1.5850 | 30.0 |
| 5 (Second Face of Second Lens) | −1.22 | (−0.82) | 0.09 | | |
| 6 (First Face of Third Lens) | −0.13 | (−8.00) | 0.57 | 1.5310 | 56.0 |
| 7 (Second Face of Third Lens) | 0.15 | (6.67) | 0.20 | | |
| 8 (First Face of Cover Glass) | 0.00 | | 0.00 | 1.5168 | 64.2 |
| 9 (Second Face of Cover Glass) (Image Surface) | 0.00 | | | | |

| Face Number | k | A | B | C | D |
|---|---|---|---|---|---|
| 1 | −7.5E−1 | 7.8E−2 | −1.2E−1 | 9.5E−1 | −2.5 |
| 2 | 0 | −8.3E−2 | −1.9E−1 | −8.4E−1 | 0 |
| 4 | 3.2E−1 | 4.3E−1 | 1.4 | 5.1E−1 | 0 |
| 5 | −6.4E−1 | 4.6E−1 | 8.9E−2 | 2.3 | −2.6 |
| 6 | 0 | −8.8E−2 | −8.2E−3 | 1.8E−1 | −9.4E−2 |
| 7 | −5.1E+2 | −1.7E−1 | 3.0E−2 | 6.3E−3 | −1.5E−2 |

Under such conditions, $d_4/fl=0.026$ was achieved, thereby satisfying the expression (1). $f_1/f_2=0.0688$ was achieved, thereby satisfying the expression (2). $L/fl=1.07$ was achieved, thereby satisfying the expression (3). $f_1/fl=0.685$ was achieved, thereby satisfying the expression (4). $f_1/f_3=-0.3551$ was achieved, thereby satisfying the expression (5). $d_2/fl=0.143$ was achieved, thereby satisfying the expression (6). $d_3/fl=0.100$ was achieved, thereby satisfying the expression (7).

Figure 13:
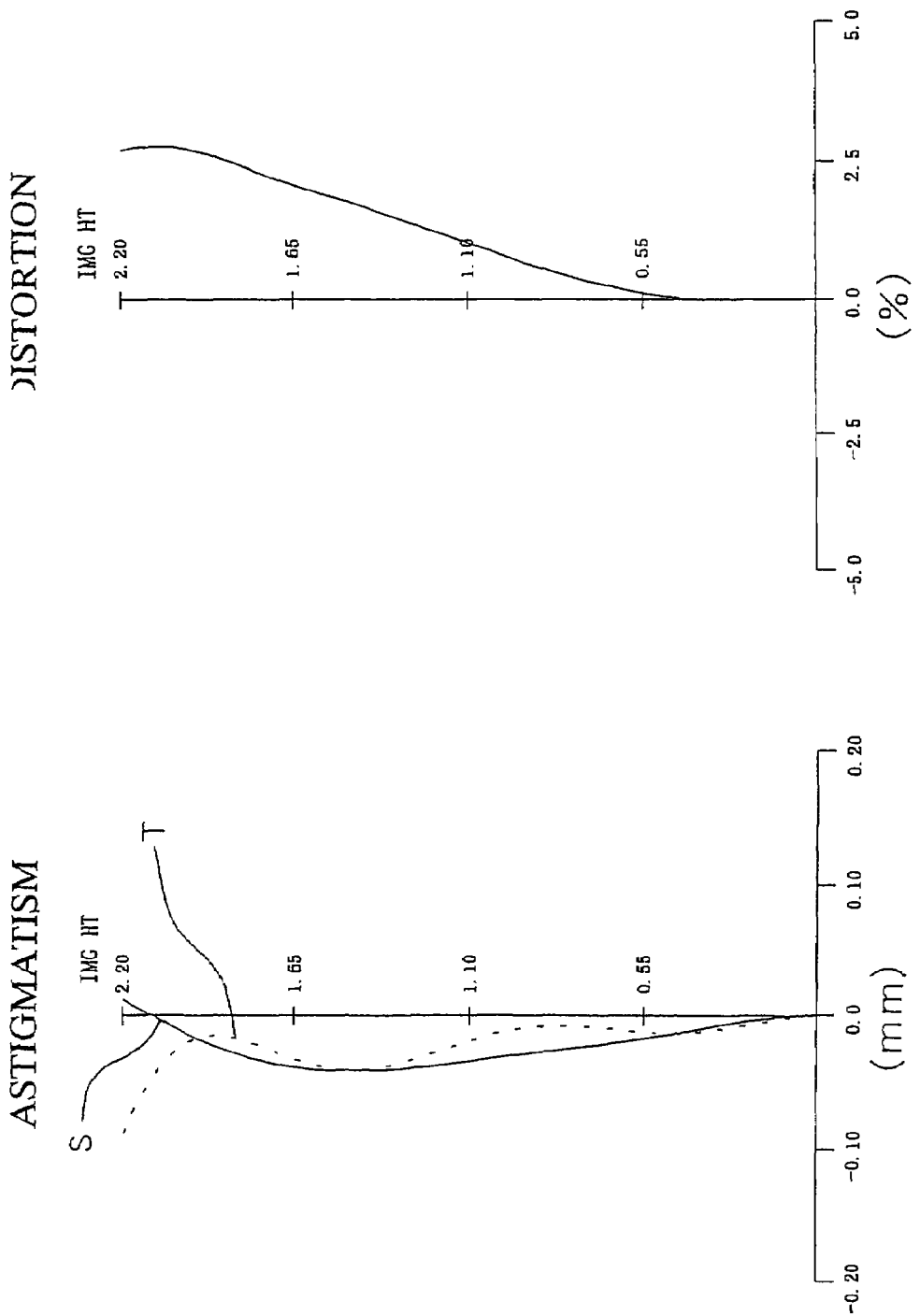
FIG. 13 shows graphs for describing the astigmatism and distortion of the imaging lens shown in FIG. 12.

FIG. 13 shows the astigmatism and the distortion in the imaging lens 1 of the SIXTH EXAMPLE.

According to the result, each of the astigmatism and the distortion was satisfied. It can be seen from the result that a sufficiently excellent optical property can be obtained.

Seventh Example

Figure 14:
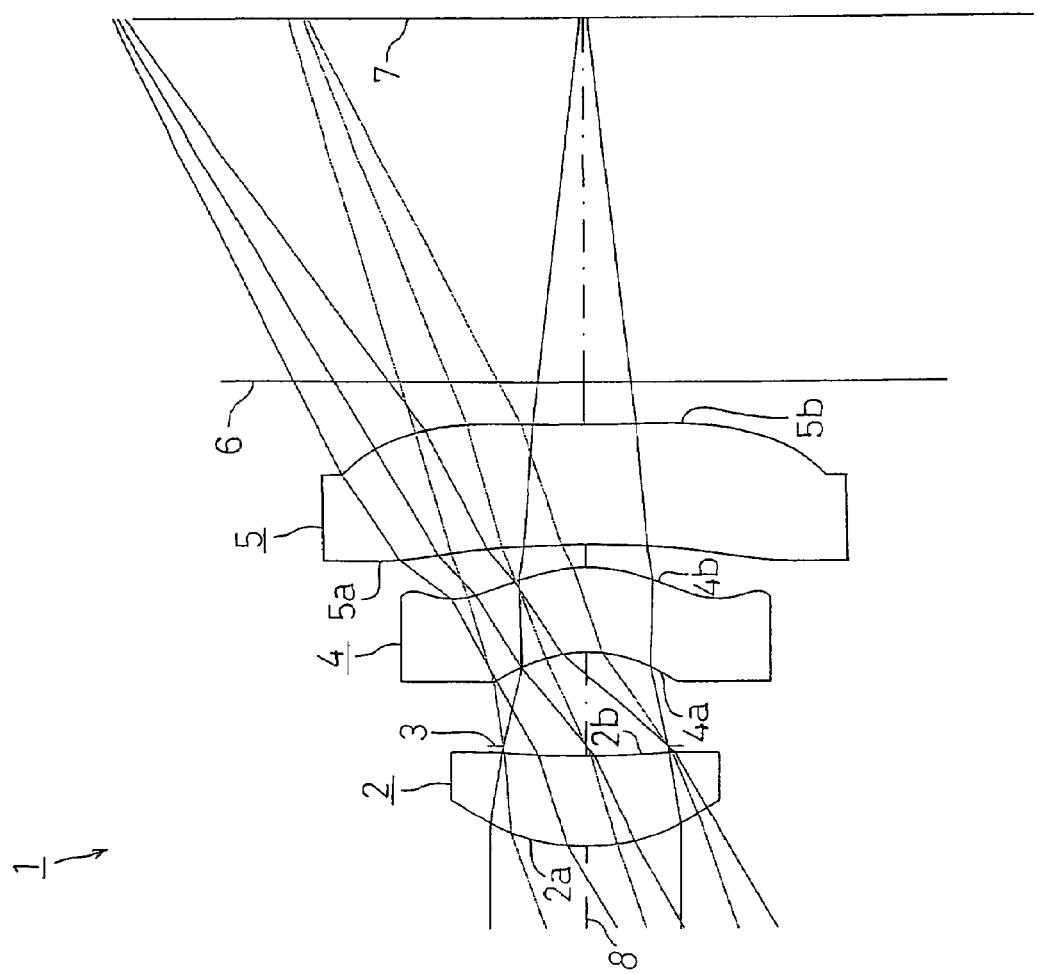
FIG. 14 is a schematic diagram for showing a SEVENTH EXAMPLE of the imaging lens according to the present invention.

FIG. 14 shows a SEVENTH EXAMPLE of the present invention. The imaging lens 1 of the SEVENTH EXAMPLE shown in FIG. 14 was set under the following conditions:

Lens Data
F no = 4.00, ω = 30.8°, L = 3.91 mm, fl = 3.64 mm, $f_1$ = 2.39 m,
$f_2$ = 33.68 mm, $f_3$ = −6.61 mm

| Face Number | c | (r) | d | nd | νd |
|---|---|---|---|---|---|
| (Object Point) | | | | | |
| 1 (First Face of First Lens) | 1.00 | (1.00) | 0.43 | 1.5310 | 56.0 |
| 2 (Second Face of First Lens) | 0.26 | (3.92) | 0.05 | | |
| 3 (Diaphragm) | 0.00 | | 0.45 | | |
| 4 (First Face of Second Lens) | −1.415 | (−0.69) | 0.40 | 1.5850 | 30.0 |
| 5 (Second Face of Second Lens) | −1.23 | (−0.81) | 0.11 | | |
| 6 (First Face of Third Lens) | −0.13 | (−7.69) | 0.57 | 1.5310 | 56.0 |
| 7 (Second Face of Third Lens) | 0.15 | (6.67) | 0.20 | | |
| 8 (First Face of Cover Glass) | 0.00 | | 0.00 | 1.5168 | 64.2 |
| 9 (Second Face of Cover Glass) | 0.00 | | | | |
| (Image Surface) | | | | | |

| Face Number | k | A | B | C | D |
|---|---|---|---|---|---|
| 1 | −7.5E−1 | 7.8E−2 | −1.2E−1 | 9.5E−1 | −2.5 |
| 2 | 0 | −8.3E−2 | −1.9E−1 | −8.4E−1 | 0 |
| 4 | 3.2E−1 | 4.3E−1 | 1.4 | 5.1E−1 | 0 |
| 5 | −6.4E−1 | 4.6E−1 | 8.9E−2 | 2.3 | −2.6 |
| 6 | 0 | −8.8E−2 | −8.2E−3 | 1.8E−1 | −9.4E−2 |
| 7 | −5.1E+2 | −1.7E−1 | 3.0E−2 | 6.3E−3 | −1.5E−2 |

Under such conditions, $d_4/fl$=0.029 was achieved, thereby satisfying the expression (1). $f_1/f_2$=0.0710 was achieved, thereby satisfying the expression (2). L/fl=1.07 was achieved, thereby satisfying the expression (3). $f_1/fl$=0.657 was achieved, thereby satisfying the expression (4). $f_1/f_3$=−0.362 was achieved, thereby satisfying the expression (5). $d_2/fl$=0.13 was achieved, thereby satisfying the expression (6). $d_3/fl$=0.110 was achieved, thereby satisfying the expression (7).

Figure 15:
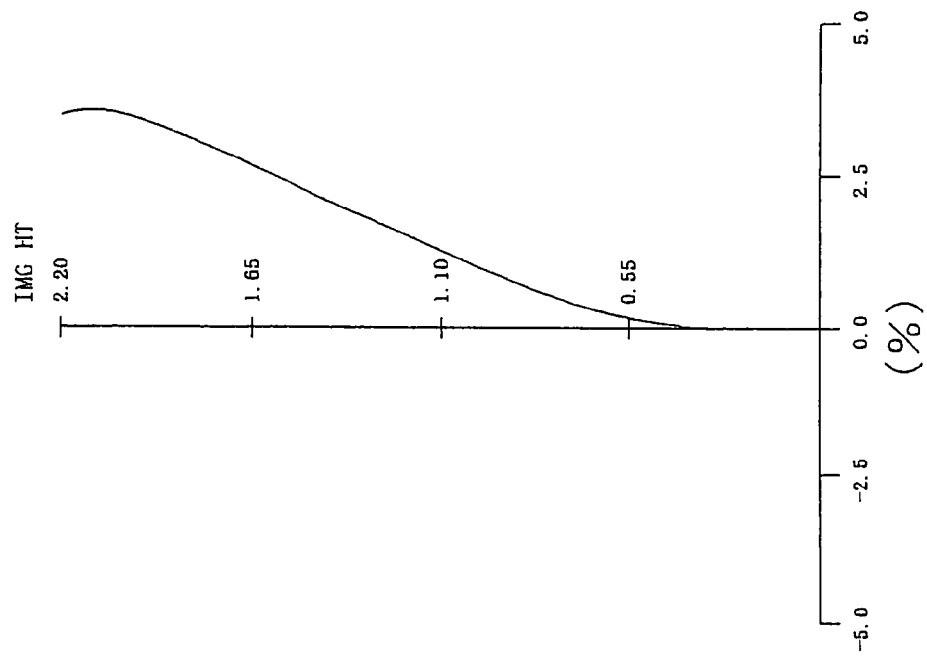
FIG. 15 shows graphs for describing the astigmatism and distortion of the imaging lens shown in FIG. 14.
Figure 15:
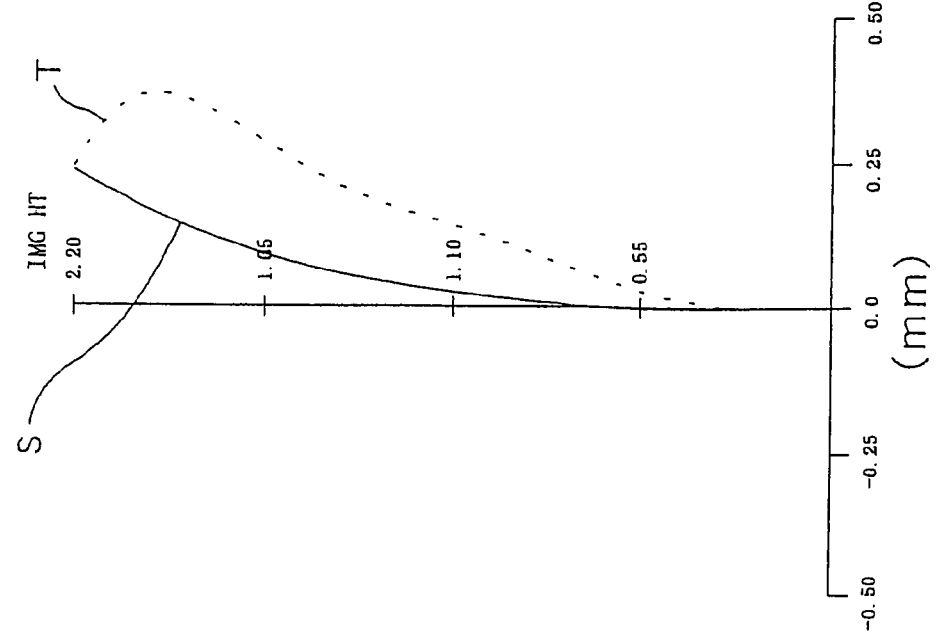

FIG. 15 shows the astigmatism and the distortion in the imaging lens 1 of the SEVENTH EXAMPLE.

According to the result, each of the astigmatism and the distortion was satisfied. It can be seen from the result that a sufficiently excellent optical property can be obtained.

Eighth Example

Figure 16:
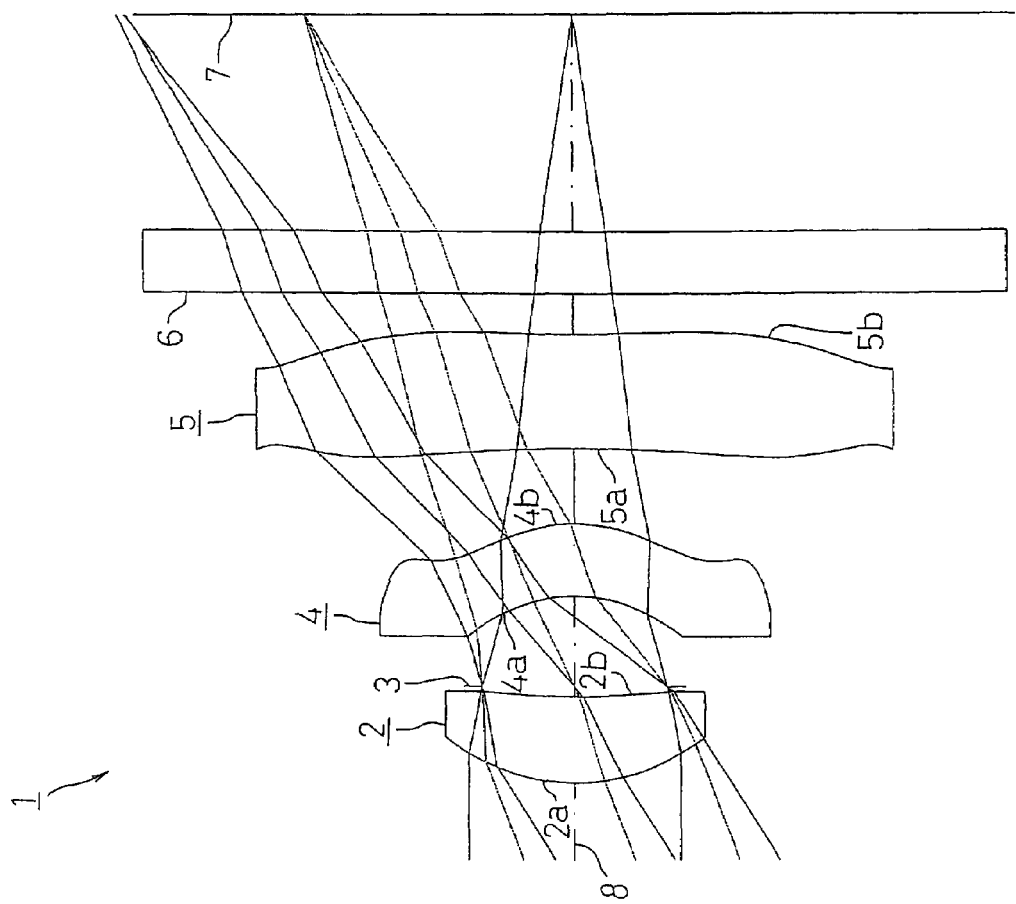
FIG. 16 is a schematic diagram for showing an EIGHTH EXAMPLE of the imaging lens according to the present invention.

FIG. 16 shows a EIGHTH EXAMPLE of the present invention. The imaging lens 1 of the EIGHTH EXAMPLE shown in FIG. 16 was set under the following conditions:

Lens Data
F no = 3.25, ω = 32.7°, L = 3.77 mm, fl = 3.42 mm, $f_1$ = 2.45 m,
$f_2$ = 35.60 mm, $f_3$ = −6.73 mm

| Face Number | c | (r) | d | nd | νd |
|---|---|---|---|---|---|
| (Object Point) | | | | | |
| 1 (First Face of First Lens) | 1.00 | (1.00) | 0.43 | 1.5310 | 56.0 |
| 2 (Second Face of First Lens) | 0.27 | (3.64) | 0.05 | | |
| 3 (Diaphragm) | 0.00 | | 0.45 | | |
| 4 (First Face of Second Lens) | −1.41 | (−0.71) | 0.35 | 1.5850 | 30.0 |
| 5 (Second Face of Second Lens) | −1.22 | (−0.82) | 0.37 | | |
| 6 (First Face of Third Lens) | −0.13 | (−8.00) | 0.57 | 1.5310 | 56.0 |
| 7 (Second Face of Third Lens) | 0.15 | (6.67) | 0.50 | | |
| 8 (First Face of Cover Glass) | 0.00 | | 0.30 | 1.5168 | 64.2 |
| 9 (Second Face of Cover Glass) | 0.00 | | | | |
| (Image Surface) | | | | | |

| Face Number | k | A | B | C | D |
|---|---|---|---|---|---|
| 1 | −7.9E−1 | 1.0E−1 | −9.1E−2 | 8.4E−1 | −2.0 |
| 2 | 0 | −5.7E−2 | −1.2E−1 | −8.4E−1 | 0 |
| 4 | 3.3E−1 | 2.5E−1 | 1.7 | 3.0E−1 | 0 |
| 5 | −5.1E−1 | 3.3E−1 | 2.0E−1 | 2.1 | −2.3 |
| 6 | 0 | −5.8E−3 | 1.3E−1 | 1.7E−2 | −6.8E−3 |
| 7 | −1.9E+2 | −8.9E−2 | 3.1E−2 | −1.4E−2 | 3.5E−3 |

Under such conditions, $d_4/fl$=0.108 was achieved, thereby satisfying the expression (1). $f_1/f_2$=0.0688 was achieved, thereby satisfying the expression (2). L/fl=1.10 was achieved, thereby satisfying the expression (3). $f_1/fl$=0.716 was achieved, thereby satisfying the expression (4). $f_1/f_3$=−0.3640 was achieved, thereby satisfying the expression (5). $d_2/fl$=0.146 was achieved, thereby satisfying the expression (6). $d_3/fl$=0.102 was achieved, thereby satisfying the expression (7).

Figure 17:
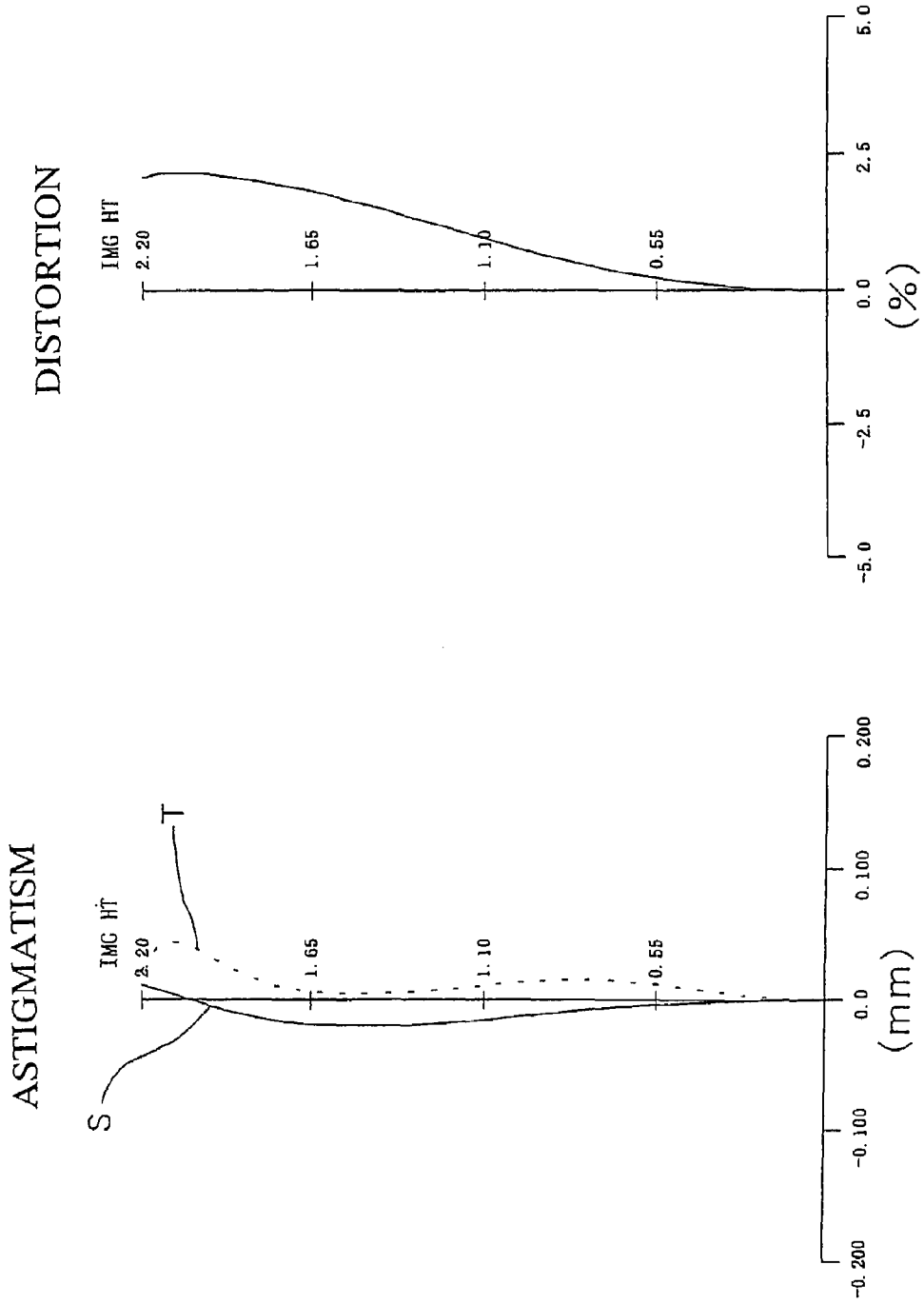
FIG. 17 shows graphs for describing the astigmatism and distortion of the imaging lens shown in FIG. 16.

FIG. 17 shows the astigmatism and the distortion in the imaging lens 1 of the EIGHTH EXAMPLE.

According to the result, each of the astigmatism and the distortion was satisfied. It can be seen from the result that a sufficiently excellent optical property can be obtained.

Ninth Example

Figure 18:
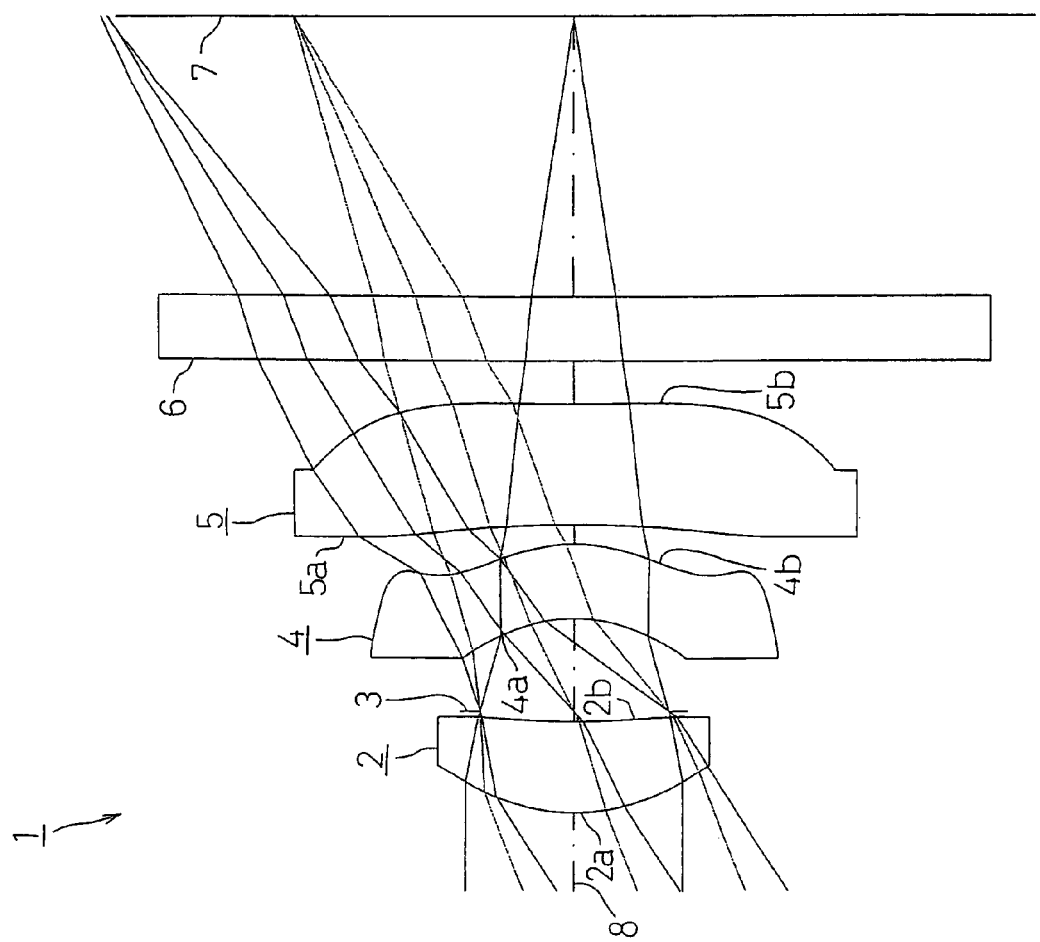
FIG. 18 is a schematic diagram for showing a NINTH EXAMPLE of the imaging lens according to the present invention.

FIG. 18 shows a NINTH EXAMPLE of the present invention. The imaging lens 1 of the NINTH EXAMPLE shown in FIG. 18 was set under the following conditions:

Lens Data
F no = 3.25, ω = 33.15°, L = 3.76 mm, fl = 3.37 mm, $f_1$ = 2.39 m,
$f_2$ = 22.24 mm, $f_3$ = −6.73 mm

| Face Number | c | (r) | d | nd | νd |
|---|---|---|---|---|---|
| (Object Point) | | | | | |
| 1 (First Face of First Lens) | 1.00 | (1.00) | 0.43 | 1.5310 | 56.0 |
| 2 (Second Face of First Lens) | 0.26 | (3.92) | 0.05 | | |
| 3 (Diaphragm) | 0.00 | | 0.45 | | |
| 4 (First Face of Second Lens) | −1.39 | (−0.72) | 0.35 | 1.5850 | 30.0 |
| 5 (Second Face of Second Lens) | −1.23 | (−0.81) | 0.09 | | |
| 6 (First Face of Third Lens) | −0.13 | (−8.00) | 0.57 | 1.5310 | 56.0 |
| 7 (Second Face of Third Lens) | 0.15 | (6.67) | 0.10 | | |
| 8 (First Face of Cover Glass) | 0.00 | | 0.30 | 1.5168 | 64.2 |
| 9 (Second Face of Cover Glass) | 0.00 | | | | |
| (Image Surface) | | | | | |

| Face Number | k | A | B | C | D |
|---|---|---|---|---|---|
| 1 | −7.0E−1 | 8.2E−2 | −1.2E−1 | 8.2E−1 | −2.2 |
| 2 | 0 | −7.2E−2 | −2.3E−1 | −7.1E−1 | 0 |
| 4 | 4.1E−1 | 4.1E−1 | 1.6 | 2.8E−1 | 0 |
| 5 | −5.9E−1 | 4.7E−1 | 1.2E−1 | 2.4 | −2.9 |
| 6 | 0 | −5.6E−2 | −2.5E−2 | 1.9E−1 | −1.0E−1 |
| 7 | −3.7E+2 | −1.8E−1 | 7.4E−2 | −4.1E−2 | 4.8E−3 |

Under such conditions, $d_4/fl$=0-0.027 was achieved, thereby satisfying the expression (1). $f_1/f_2$=0.108 was achieved, thereby satisfying the expression (2). L/fl=1.12 was achieved, thereby satisfying the expression (3). $f_1/fl$=0.709 was achieved, thereby satisfying the expression (4). $f_1/f_3=-0.3551$ was achieved, thereby satisfying the expression (5). $d_2/fl=0.148$ was achieved, thereby satisfying the expression (6). $d_3/fl=0.104$ was achieved, thereby satisfying the expression (7).

Figure 19:
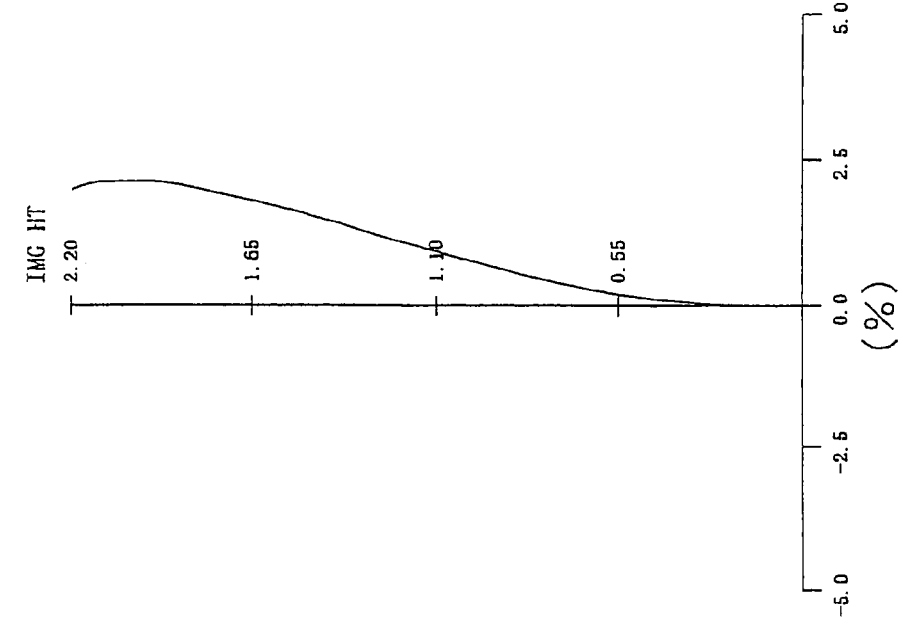
FIG. 19 shows graphs for describing the astigmatism and distortion of the imaging lens shown in FIG. 18.

FIG. 19 shows the astigmatism and the distortion in the imaging lens 1 of the NINTH EXAMPLE.

According to the result, each of the astigmatism and the distortion was satisfied. It can be seen from the result that a sufficiently excellent optical property can be obtained.

According to the result, each of the spherical aberration, the astigmatism, and the distortion was almost satisfied. It can be seen from the result that a sufficient optical property can be obtained.

The present invention is not limited to the above-described embodiment. Various modifications can be made as required. For example, a light-transmissive material can be suitably used as the material for the first lens, the second lens, and the third lens.

What is claimed is:

1. An imaging lens used for forming an image of an object on an image-taking surface of an image sensor element, comprising:

in order from an object side to an image surface side along an optical axis, a first lens that is a meniscus lens having a positive power whose convex surface faces the object side, a diaphragm, a second lens that is a meniscus lens having a positive power whose convex surface faces the image surface side, and a third lens that is a biconcave lens having a negative power, wherein conditions expressed by the following expressions (1) and (2) are to be satisfied:

$$0.023 \leq d_4/fl \leq 0.11 \quad (1)$$

$$0.068 < f_1/f_2 \leq 0.8 \quad (2)$$

where, $d_4$: distance between the second lens and the third lens on the optical axis $fl$: focal distance of the entire lens system $f_1$: focal distance of the first lens $f_2$: focal distance of the second lens.

2. The imaging lens according to claim 1, wherein:
a condition expressed by a following expression (3) is to be further satisfied:

$$1 \leq L/fl \leq 1.3 \quad (3)$$

where,

L: overall length of lens system (distance from the surface of the first lens on the object side to the image-taking surface).

3. The imaging lens according to claim 2, wherein:
a condition expressed by a following expression (4) is to be further satisfied:

$$0.6 \leq f_1/fl \leq 0.9 \quad (4).$$

4. The imaging lens according to claim 3, wherein:
a condition expressed by a following expression (5) is to be further satisfied:

$$-1 \leq f_1/f_3 \leq -0.1 \quad (5)$$

where, $f_3$: focal distance of the third lens.

5. The imaging lens according to claim 4, wherein:
a condition expressed by a following expression (6) is to be further satisfied:

$$0.12 \leq d_2/fl \leq 0.2 \quad (6)$$

where, $d_2$: distance between the first lens and the second lens on the optical axis.

6. The imaging lens according to claim 5, wherein:
a condition expressed by a following expression (7) is to be further satisfied:

$$0.01 \leq d_3/fl \leq 0.2 \quad (7)$$

where, $d_3$: center thickness of the second lens.

7. The imaging lens according to claim 1, wherein:
a condition expressed by a following expression (4) is to be further satisfied:

$$0.6 \leq f_1/fl \leq 0.9 \quad (4).$$

8. The imaging lens according to claim 1, wherein:
a condition expressed by a following expression (5) is to be further satisfied:

$$-1 \leq f_1/f_3 \leq -0.1 \quad (5)$$

where, $f_3$: focal distance of the third lens.

9. The imaging lens according to claim 1, wherein:
a condition expressed by a following expression (6) is to be further satisfied:

$$0.12 \leq d_2/fl \leq 0.2 \quad (6)$$

where, $d_2$: distance between the first lens and the second lens on the optical axis.

10. The imaging lens according to claim 1, wherein:
a condition expressed by a following expression (7) is to be further satisfied:

$$0.01 \leq d_3/fl \leq 0.2 \quad (7)$$

where, $d_3$: center thickness of the second lens.

* * * * *